US012665271B2

(12) United States Patent (10) Patent No.: US 12,665,271 B2
Fujisaki (45) Date of Patent: Jun. 23, 2026

(54) SECONDARY BATTERY

(71) Applicant: TOYOTA JIDOSHA KABUSHIKI KAISHA, Toyota (JP)

(72) Inventor: Sadao Fujisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 522 days.

(21) Appl. No.: 17/987,396

(22) Filed: Nov. 15, 2022

(65) Prior Publication Data

US 2023/0178862 A1 Jun. 8, 2023

(30) Foreign Application Priority Data

Dec. 6, 2021 (JP) ................................. 2021-198104
Mar. 28, 2022 (JP) ................................. 2022-051954

(51) Int. Cl.
| *H01M 50/553* | (2021.01) |
| *H01M 4/78* | (2006.01) |
| *H01M 50/103* | (2021.01) |
| *H01M 50/119* | (2021.01) |
| *H01M 50/121* | (2021.01) |
| *H01M 50/15* | (2021.01) |
| *H01M 50/548* | (2021.01) |

(52) U.S. Cl.
CPC .......... *H01M 50/553* (2021.01); *H01M 4/78* (2013.01); *H01M 50/103* (2021.01); *H01M 50/119* (2021.01); *H01M 50/121* (2021.01); *H01M 50/15* (2021.01); *H01M 50/548* (2021.01)

(58) Field of Classification Search
None
See application file for complete search history.

(56) References Cited

U.S. PATENT DOCUMENTS

| 2010/0227217 A1 | 9/2010 | Fujikawa et al. | |
| 2011/0117404 A1* | 5/2011 | Ahn ...................... | H01M 50/16 |
| | | | 429/94 |

(Continued)

FOREIGN PATENT DOCUMENTS

| CN | 101809780 A | 8/2010 |
| JP | S47-025125 | † 11/1972 |

(Continued)

OTHER PUBLICATIONS

U.S. Appl. No. 17/961,837, filed Oct. 7, 2022 in the name of Sadao Fujisaki.
English Language Abstract for JP 2017-532715 (LG Chem Ltd.).

*Primary Examiner* — Scott J. Chmielecki
(74) *Attorney, Agent, or Firm* — Oliff PLC

(57) ABSTRACT

A secondary battery includes: a power generation element; and an exterior part that houses the power generation element in the exterior part. The exterior part includes a cylindrical section that includes opening portions on two opposing sides, cover terminals that are disposed in the respective opening portions, and resins respectively disposed between the cylindrical section and the cover terminals. The cylindrical section and the cover terminals are respectively integrated with the resins. Power collectors of the power generation element are electrically connected with the cover terminals, respectively.

13 Claims, 20 Drawing Sheets

(56)                    References Cited

U.S. PATENT DOCUMENTS

| | | | |
|---|---|---|---|
| 2012/0141850 A1* | 6/2012 | Jeong .................. | H01M 50/553 |
| | | | 429/94 |
| 2017/0237045 A1* | 8/2017 | Kim ..................... | H01M 50/15 |
| | | | 429/179 |
| 2018/0212210 A1* | 7/2018 | Suzuki ................ | H01M 50/119 |
| 2021/0242522 A1† | 8/2021 | Daub | |
| 2022/0399564 A1* | 12/2022 | Lee ..................... | H01M 50/609 |

FOREIGN PATENT DOCUMENTS

| JP | S47-025125 U | 11/1972 |
|---|---|---|
| JP | H02-037661 A | 2/1990 |
| JP | 2000-090903 A | 3/2000 |
| JP | 2011-076786 A | 4/2011 |
| JP | 2011-108623 A | 6/2011 |
| JP | 2011-113811 A | 6/2011 |
| JP | 2015-041581 † | 3/2015 |
| JP | 2015-041581 A | 3/2015 |
| JP | 2017-532715 A | 11/2017 |
| JP | 2018-116917 A | 7/2018 |
| JP | 2018-160398 A | 10/2018 |
| JP | 2018-181622 A | 11/2018 |
| JP | 2020-173900 A | 10/2020 |

\* cited by examiner
† cited by third party

100

100

21

122

23

222

22c

22d

22h

22e

L3

L1

222

102

121

121d

121a

121d

121a

121b

121c

FIG. 14A
221
221d
221a
FIG. 14B
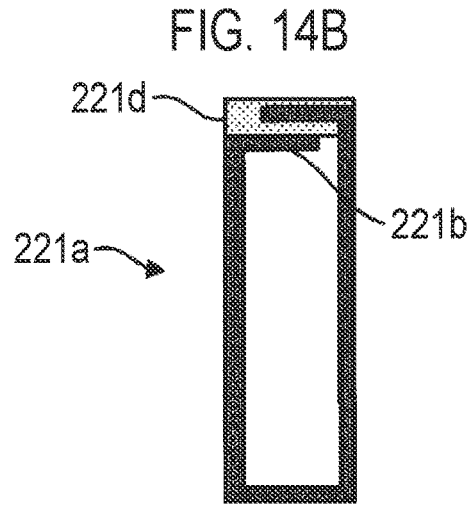
221d
221b
221a
FIG. 15
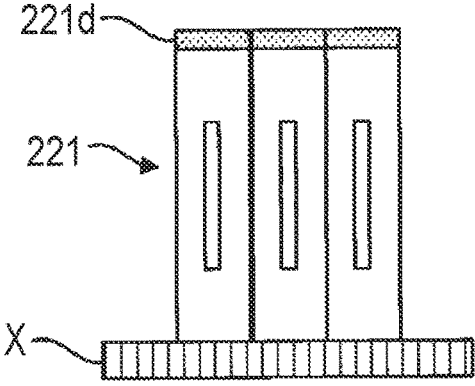
221d
221
X <u>103</u>

325

SECONDARY BATTERY

CROSS-REFERENCE TO RELATED APPLICATION

This application claims priority to Japanese Patent Application No. 2021-198104 filed on Dec. 6, 2021 and Japanese Patent Application No. 2022-051954 filed on Mar. 28, 2022, each incorporated herein by reference in its entirety.

BACKGROUND

1. Technical Field

The present disclosure relates to a secondary battery.

2. Description of Related Art

Batteries, such as lithium-ion secondary batteries, are widely used as portable power sources for personal computers and portable terminals and power sources for driving vehicles. A laminate type battery is known as an example of the battery. The laminate type battery has a structure in which a power generation element is sealed inside a laminate exterior body formed by superimposing film-like laminate sheets. Further, a laminate type battery has a sealing region which is formed by adhering the edges of oppositely disposed laminate exterior bodies in a state in which a terminal electrically connected to the power generation element protrudes outward from the inside of the laminate exterior body. Thereby, the power generation element is sealed inside the laminate exterior body. Further, the laminate type battery has a sealing region which is formed by superimposing and adhering laminate sheets on the outside of the power generation element.

Reduction in size of the battery structure is being studied. For example, Japanese Unexamined Patent Application Publication No. 2020-173900 (JP 2020-173900 A) discloses a technology for reducing a size of a laminate type battery by folding a sealing region provided at the end portion of the battery. Japanese Unexamined Patent Application Publication No. 2-37661 (JP 2-37661 A) discloses a technology for reducing a size of a laminate type battery using a cover by folding a sealing region provided at the end portion of the cover. Japanese Unexamined Patent Application Publication No. 2011-108623 (JP 2011-108623 A) discloses a structure in a lithium polymer secondary battery, which includes an exterior material surrounding the exterior of an electrode assembly and first and second covers for sealing the exterior material.

SUMMARY

Although the technologies disclosed in JP 2020-173900 A, JP 2-37661 A, and JP 2011-108623 A are able to reduce the size of laminate type batteries, there has been a demand for further improvement in structural efficiency of secondary batteries.

The size of the laminate type battery can be reduced by, for example, shortening the width (seal width) of the sealing region with an electrode terminal interposed therebetween, but usually it is necessary to set the seal width as a length greater than 3 mm. The reasons for the above are as follows. (1) If the seal width is too short, it is difficult to achieve appropriate heat adhesion, which may result in sealing failure. (2) Since the laminate exterior body does not have high rigidity, if the seal width is short, the cementing of the sealing region may be peeled off due to an external impact, and the cemented surface may not be maintained. Further, in a laminate type battery which has a cover, in a case where the cover is tilted due to the external impact, if the seal width is short, the correction force to restore the tilt is weak, so the cemented surface may not be appropriately maintained. (3) At the time of heat adhesion, in a case where the outer circumferential surface of the terminal or cover is not parallel to the cemented surface of the laminate exterior body, a short seal width weakens the correction force to restore the tilt. Hence, the heat adhesion cannot be performed appropriately, and the possibility of sealing failure increases. (4) At the time of heat adhesion, if the seal width is short, the pressure per unit area applied to the sealing region by the heat adhesion head increases. Thus, there is a risk that the metal layer inside the laminate exterior body may go over the insulation layer and dig into the terminal. In the case where the metal layer digs into the terminal, it is undesirable since this situation causes short-circuiting. For the above-mentioned reasons, it has been difficult to shorten the seal width and reduce the size of the laminate type battery.

The present disclosure provides a secondary battery capable of improving structural efficiency.

A first aspect of the disclosure relates to a secondary battery according to an aspect of the present disclosure including a power generation element; and an exterior part that houses the power generation element in the exterior part. The exterior part includes a cylindrical section that includes opening portions on two opposing sides, cover terminals that are disposed in the respective opening portions, and resins respectively disposed between the cylindrical section and the cover terminals. The cylindrical section and the cover terminals are respectively integrated with the resins. Power collectors of the power generation element are electrically connected with the cover terminals, respectively.

In the secondary battery according to the first aspect of the present disclosure, a width or a thickness of each of the cover terminals may be less than or equal to a width or a thickness of the power generation element.

In the secondary battery according to the first aspect of the present disclosure, regarding a relationship of a thickness of the cylindrical section, a thickness of an inner surface of the cylindrical section, a thickness of the power generation element, and thicknesses of the cover terminals, the thickness of the inner surface of the cylindrical section may be less than the thickness of the cylindrical section, the thickness of the power generation element may be equal to or less than the thickness of the inner surface of the cylindrical section, and the thicknesses of the cover terminals may be less than or equal to the thickness of the power generation element.

In the secondary battery according to the first aspect of the present disclosure, regarding a relationship of a width of the cylindrical section, a width of an inner surface of the cylindrical section, a width of the power generation element, and widths of the cover terminals, the width of the inner surface of the cylindrical section may be less than the width of the cylindrical section, the width of the power generation element may be equal to or less than the width of the inner surface of the cylindrical section, and the widths of the cover terminals may be less than or equal to the width of the power generation element.

In the secondary battery according to the first aspect of the present disclosure, the power collectors may be curved and electrically connected with the cover terminals, respectively.

In the secondary battery according to the first aspect of the present disclosure, the power generation element may include at least one of the power collectors, an inner surface of the cover terminal may include at least one slit portion, and the power collector may be disposed in the slit portion, and the power collector may be electrically connected with the cover terminal.

In the secondary battery according to the first aspect of the present disclosure, an insulation sheet may be disposed between the power generation element and each of the cover terminals.

In the secondary battery according to the first aspect of the present disclosure, the cover terminals may respectively include projection portions that project outward, and the resin may be disposed on at least a part of an outer circumferential surface of each of the projection portions.

In the secondary battery according to the first aspect of the present disclosure, the cover terminals may include protrusion portions that protrude inward from end portions of inner surfaces of the cover terminals.

In the secondary battery according to the first aspect of the present disclosure, the exterior part may include a second resin filled in the exterior part, and the cylindrical section, the cover terminals, and the power generation element may be integrated with the second resin.

In the secondary battery according to the first aspect of the present disclosure, the cylindrical section may be a cylindrical metal body or a metal laminate film which is formed into a cylindrical shape.

In the secondary battery according to the first aspect of the present disclosure, the cylindrical section may be constituted of two metal plates and a third resin, the metal plates each may include a bottom surface and a protrusion portion that protrudes in the same direction from opposing end portions of the bottom surface, the metal plates may be superimposed upside down, the protrusion portion may be superimposed on each of opposing side surfaces of the cylindrical section, the third resin may be disposed to cover each of the side surfaces of the cylindrical section, and the end portions of the superimposed metal plates may be integrated with the third resin.

In the secondary battery according to the first aspect of the present disclosure, the cylindrical section may be constituted of one metal plate and a third resin, the metal plate may be formed into a cylindrical shape, an end portion of the metal plate may be superimposed on one side surface of the cylindrical section, and the third resin may be disposed to cover the side surface on which the end portions may be superimposed, and the end portion of the superimposed metal plate may be integrated with the third resin.

According to the secondary battery of the first aspect of the present disclosure, it is possible to improve structural efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14A is a plan view of the cylindrical section;

FIG. 14B is a cross-sectional view of the cylindrical section in the width direction;

FIG. 15 is a diagram which shows one cooling mode of a secondary battery that uses the cylindrical section;

DETAILED DESCRIPTION OF EMBODIMENTS

Figure 1:
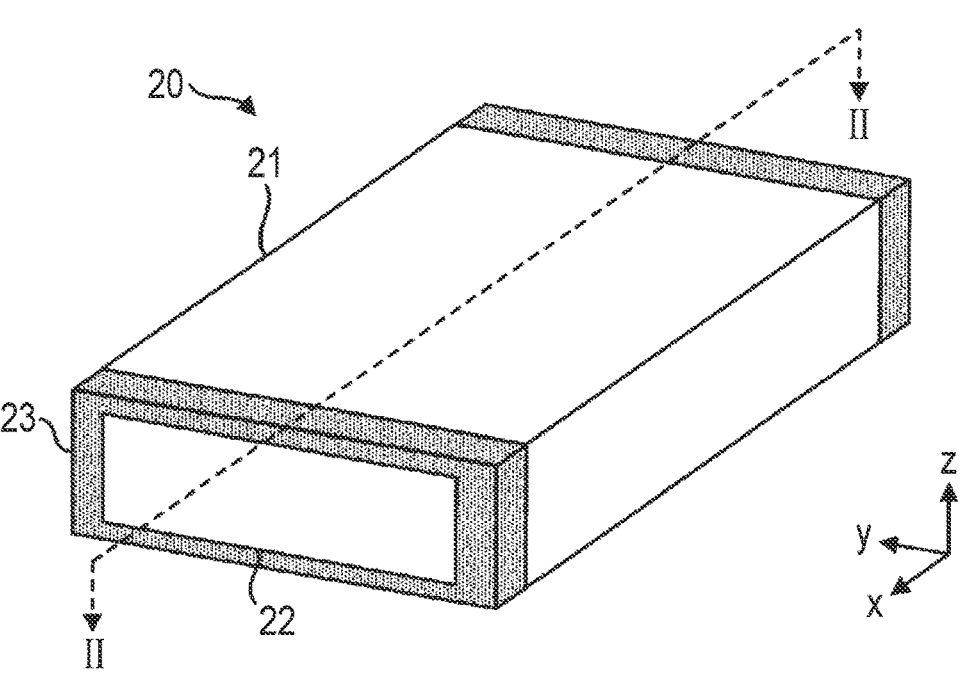
FIG. 1 is a perspective view of a secondary battery.
Figure 2:
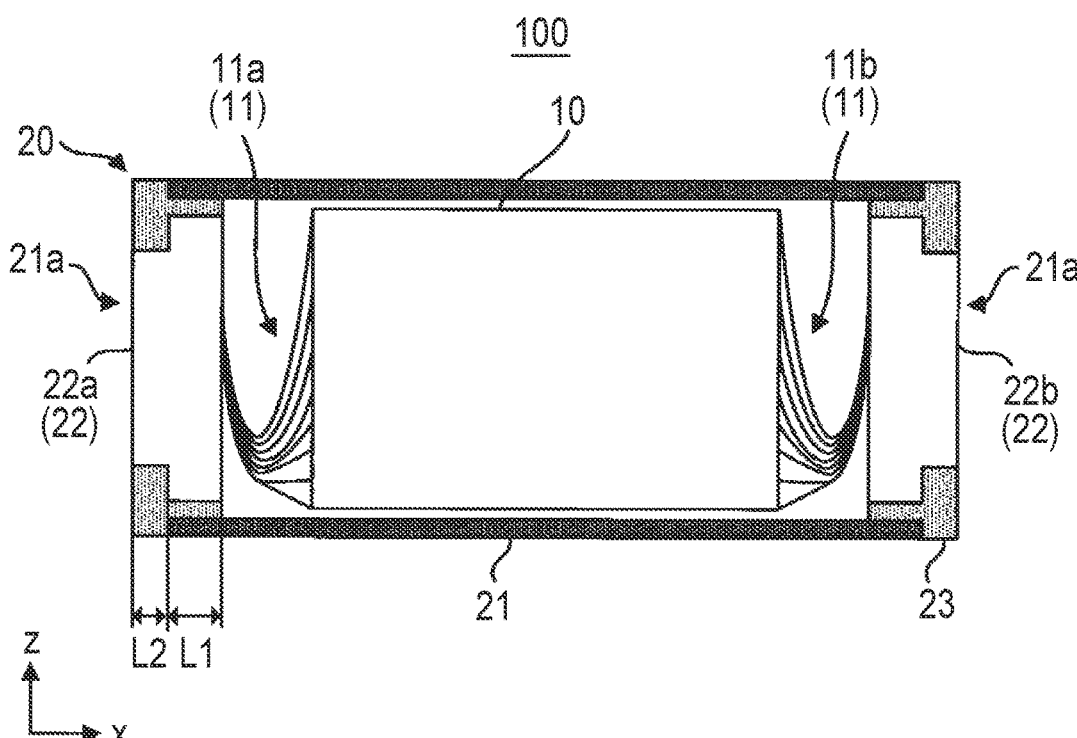
FIG. 2 is a longitudinal cross-sectional view taken along the line II-II of FIG. 1.

The secondary battery according to the aspect of the present disclosure will be described using secondary batteries 100 to 103 as one embodiment. FIG. 1 shows a perspective view of the secondary battery 100. FIG. 2 shows a longitudinal cross-sectional view taken along the line II-II in FIG. 1. In FIGS. 1 and 2, a longitudinal direction of the secondary battery 100 is indicated by x, a width direction of the secondary battery 100 is indicated by y, and a thickness direction of the secondary battery 100 is indicated by z. The directions are mutually orthogonal.

The secondary battery 100 includes a power generation element 10 and an exterior part 20 that houses the power generation element 10 therein. The exterior part 20 includes a cylindrical section 21 that has opening portions 21*a* on two opposing sides, cover terminals 22 (a positive electrode cover terminal 22*a* and a negative electrode cover terminal 22*b*) that are disposed in the respective opening portions 21*a*, and resins 23 (hereinafter sometimes referred to as "first resins 23") that are disposed between the cylindrical section 21 and the cover terminals 22. The cylindrical section 21 and the cover terminals 22 are respectively integrated with the resins 23. The power collectors 11 (the positive electrode power collector 11*a* and the negative electrode power collector 11*b*) of the power generation element 10 are electrically connected with the cover terminals 22, respectively.

Power Generation Element 10

The power generation element 10 is formed by laminating a positive electrode power collector 11*a*, a positive electrode active material layer, an electrolyte layer, a negative electrode active material layer, and a negative electrode power collector 11*b* (hereinafter, the elements may be collectively referred to as "electrode elements"). The electrode elements are laminated in the thickness direction. The number of electrode elements to be laminated is not particularly limited. The power generation element 10 of FIG. 2 is a configuration in which a plurality of the electrode elements described above are laminated. Further, the electrode elements described above may be laminated so as to be electrically in series, or may be laminated so as to be electrically parallel.

The power generation element 10 in FIG. 2 has a sheet-like shape, and is rectangular in plan view. Note that the power generation element 10 is not particularly limited as long as the power generation element 10 has a shape that can be housed inside the exterior part 20. Further, as shown in FIG. 2, the respective power collectors 11 of the power generation element 10 are electrically connected to the respective cover terminals 22 through power collector tabs. Specifically, the positive electrode power collector 11*a* is electrically connected to the positive electrode cover terminal 22*a* through a positive electrode power collector tab. The negative electrode power collector 11*b* is electrically connected to the negative electrode cover terminal 22*b* through a negative electrode power collector tab. However, the respective power collectors 11 may be electrically connected to the cover terminals 22 without the power collector tabs.

As described above, the power generation element 10 has an electrode laminate in which the electrode elements are laminated and the power collector tabs which extend from the electrode laminate. In the present specification, in a case where the power generation element 10 is described, the power generation element 10 may mean the entire power generation element 10 that includes the electrode laminate and the power collector tabs, or may mean solely the electrode laminate. In a case where the power generation element 10 means solely an electrode laminate, the power generation element 10 may be described as "power generation element 10 (electrode laminate)". Further, in the present specification, the power collector tabs (the positive electrode power collector tab and the negative electrode power collector tab) are described as power collectors 11 (the positive electrode power collector 11*a* and the negative electrode power collector 11*b*).

The power generation element 10 may be subjected to a predetermined insulation treatment in order to reduce short-circuiting due to contact with the cylindrical section 21. For example, the power generation element 10 may be enveloped with an insulation film, an insulation sheet may be disposed between the power generation element 10 and the cylindrical section 21, and an insulation tape may be attached onto the inner surface of the power generation element 10 or the cylindrical section 21. In such a manner, the insulation treatment may be performed such that a predetermined insulation layer is disposed on the outer circumferential portion of the power generation element 10.

In the thickness direction, the power generation element 10 and the cylindrical section 21 may be in contact with each other as long as any one of the insulation treatments is performed. In such a case, a thickness of the cover terminals 22 may be less than a thickness of the power generation element 10 by a thickness of the first resins 23 filled between the cylindrical section 21 and the cover terminals 22. Specifically, the thickness of the power generation element 10 may be equal to or greater than the thickness of the cover terminals 22 and may be greater than the thickness of the cover terminals 22. Further, both sides of the power generation element 10 in the thickness direction may be in contact with an inner surface of the cylindrical section 21. In other words, the thickness of the power generation element 10 may satisfy the following relationship: the thickness of the cylindrical section 21>the thickness of the inner surface of the cylindrical section 21≥the thickness of the power generation element 10≥the thickness of the cover terminal. Thereby, extra space can be eliminated, and it is possible to further improve the structural efficiency of the secondary battery 100.

In a similar manner, in the width direction, the power generation element 10 and the cylindrical section 21 may be in contact with each other as long as any one of the insulation treatments is performed. In such a case, a width of the cover terminals 22 may be less than a width of the power generation element 10 by the thickness of the first resins 23 filled between the cylindrical section 21 and the cover terminals 22. Specifically, the width of the power generation element 10 may be equal to or greater than the width of the cover terminals 22 and may be greater than the width of the cover terminals 22. Furthermore, both sides in the width direction of the power generation element 10 may be in contact with the inner surface of the cylindrical section 21. In other words, the width of the power generation element 10 may satisfy the following relationship: the width of the cylindrical section 21>the width of the inner surface of the cylindrical section 21>the width of the power generation element 10>the width of the cover terminal. Thereby, extra space can be eliminated, and it is possible to further improve the structural efficiency of the secondary battery 100.

The power generation element 10 may be a solid battery or a liquid battery. The solid battery is preferred. Further, the type of the power generation element 10 is not particularly limited, and any secondary battery can be used. For example, the power generation element 10 may be a power generation element for a lithium ion secondary battery or a power generation element for a sodium ion secondary battery. Materials for the power generation element of the lithium ion secondary battery will be described below.

Positive Electrode Power Collector 11A and Negative Electrode Power Collector 11B The positive electrode power collector 11*a* and the negative electrode power collector 11*b* are sheet-like metal foils. Metals which constitute the positive electrode power collector 11*a* and the negative electrode power collector 11*b* are not particularly limited, but examples thereof include Cu, Ni, Cr, Au, Pt, Ag, Al, Fe, Ti, Zn, Co, and stainless steel. Al is preferable as the metal which constitutes the positive electrode power collector 11*a*. Cu is preferable as a material which is used for forming the negative electrode power collector 11*b*. Further, the positive electrode power collector 11*a* and the negative electrode power collector 11*b* may each have a power collector tab. Each power collector tab may be constituted of the same material as each power collector.

The positive electrode power collector 11*a* and the negative electrode power collector 11*b* may have some kind of coat layer (for example, a carbon coat layer) for adjusting the resistance on their surfaces. The thickness of the positive electrode power collector 11*a* and the negative electrode power collector 11*b* may be, for example, equal to or greater than 0.1 μm and equal to or less than 1 mm.

Positive Electrode Active Material Layer

A positive electrode active material layer is a sheet-like layer which includes a positive electrode active material. The positive electrode active material is not particularly limited as long as the material is a positive electrode active material that can be used in lithium ion secondary batteries.

Examples thereof include various lithium-containing composite oxides, such as lithium cobaltate, lithium nickelate, lithium manganate, nickel-cobalt-lithium manganate, and spinel-based lithium compounds.

The positive electrode active material layer may optionally include a conductive aid and a binder. The binder is not particularly limited as long as the binder can be used for lithium ion secondary batteries. Examples include butadiene rubber (BR), butylene rubber (IIR), acrylate butadiene rubber (ABR), and polyvinylidene fluoride (PVdF). The conductive aid is not particularly limited as long as the conductive aid is a conductive aid that can be used in lithium ion secondary batteries. Examples include carbon materials, such as acetylene black and ketjen black, and metal materials, such as nickel, aluminum, and stainless steel.

In a case where the secondary battery 100 is an all-solid battery, the positive electrode active material layer may optionally include a solid electrolyte. The solid electrolyte is not particularly limited as long as the solid electrolyte is a solid electrolyte that can be used for lithium ion secondary batteries. For example, the solid electrolyte may be an organic polymer electrolyte or an inorganic solid electrolyte. The inorganic solid electrolyte is preferred. The reason for the above is that they have higher ionic conductivity and superior heat resistance than organic polymer electrolytes. The inorganic solid electrolyte may be an oxide solid electrolyte or a sulfide solid electrolyte. The sulfide solid electrolyte is preferred. Examples of the oxide solid electrolytes include lithium lanthanum zirconate, LiPON, $Li_{1+}$ $_x$AlXGe$_{2-x}$(PO$_4$)$_3$, Li—SiO-based glass, Li—Al—S—O-based glass, and the like. Examples of the sulfide solid electrolytes include $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, $Li_2S$—$P_2S_5$—$GeS_2$ and the like.

The content of each component in the positive electrode active material layer may be appropriately set in accordance with the purpose. Further, a surface of the positive electrode active material may be coated with an oxide layer, such as a lithium niobate layer, a lithium titanate layer, a lithium phosphate layer, or the like. A thickness of the positive electrode active material layer may be, for example, equal to or greater than 0.1 μm and equal to or less than 1 mm.

Negative Electrode Active Material Layer

A negative electrode active material layer is a sheet-like layer which includes a negative electrode active material. The negative electrode active material is not particularly limited as long as the material is a negative electrode active material that can be used in lithium ion secondary batteries. Examples thereof include Si and Si alloys, silicon-based active materials, such as silicon oxide, carbon-based active materials, such as graphite and hard carbon, various oxide-based active materials, such as lithium titanate, metallic lithium and lithium alloys.

The negative electrode active material layer may optionally include a conductive aid and a binder. The conductive aid and binder can be appropriately selected from conductive aids and binders that can be used for the positive electrode active material layer. Further, in a case where the secondary battery 100 is an all-solid battery, the negative electrode active material layer may optionally include a solid electrolyte. The solid electrolyte can be appropriately selected from solid electrolytes that can be used for the positive electrode active material layer.

The content of each component in the negative electrode active material layer may be appropriately set in accordance with the purpose. The thickness of the negative electrode active material layer may be, for example, equal to or greater than 0.1 μm and equal to or less than 1 mm.

Electrolyte Layer

In a case where the secondary battery 100 is an all-solid battery, the electrolyte layer is a sheet-like solid electrolyte layer. The solid electrolyte layer includes a solid electrolyte. The solid electrolyte can be appropriately selected from solid electrolytes that can be used for the positive electrode active material layer. The solid electrolyte layer may also optionally include a binder. The binder can be appropriately selected from binders that can be used for the positive electrode active material layer. The content of each component in the solid electrolyte layer may be appropriately set in accordance with the purpose. The thickness of the solid electrolyte layer may be, for example, equal to or greater than 0.1 μm and equal to or less than 1 mm.

In a case where secondary battery 100 is a liquid-based battery, the electrolyte layer includes an electrolytic solution and a separator. The electrolytic solution and the separator are not particularly limited as long as the electrolytic solution and the separator can be used in lithium ion secondary batteries. Examples of the separator include porous sheets (films) made of polyolefin, such as polyethylene (PE) and polypropylene (PP). The thickness of the separator may be, for example, equal to or greater than 0.1 μm and equal to or less than 1 mm. The electrolytic solution usually contains a non-aqueous solvent and a supporting salt. Examples of the non-aqueous solvents include carbonates, ethers, esters, nitriles, sulfones, lactones and the like. Examples of the supporting salts include $LiPF_6$, $LiBF_4$, lithium bis(fluorosulfonyl)imide (LiFSI), lithium bis(trifluoromethane)sulfonimide (LiTFSI) and the like. The concentration of the supporting salt in the electrolytic solution is not particularly limited. However, may be, for example, equal to or greater than 0.5 mol/L and equal to or less than 5 mol/L. Further, the electrolytic solution may contain optional components such as a gas generating agent, a film forming agent, a dispersant, and a thickening agent.

Exterior Part 20

The exterior part 20 includes a cylindrical section 21 that has opening portions 21a on two opposing sides, cover terminals 22 (a positive electrode cover terminal 22a and a negative electrode cover terminal 22b) that are disposed in the respective opening portions 21a, and first resins 23 that are disposed between the cylindrical section 21 and the cover terminals 22. The cylindrical section 21 and the cover terminals 22 are integrated with the first resins 23.

Cylindrical Section 21

Figure 3A:
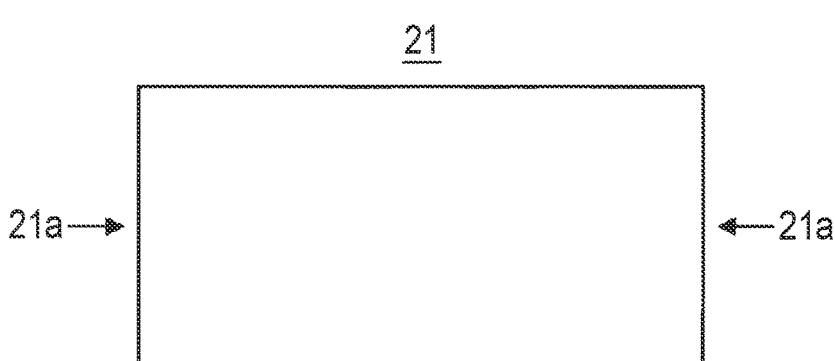
FIG. 3A is a plan view of a cylindrical section.
Figure 3B:
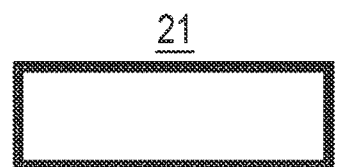
FIG. 3B is a cross-sectional view of the cylindrical section in a width direction.
Figure 3C:
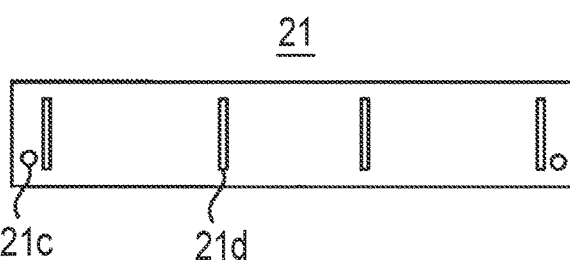
FIG. 3C is a side view of the cylindrical section viewed from the width direction.
Figure 26:
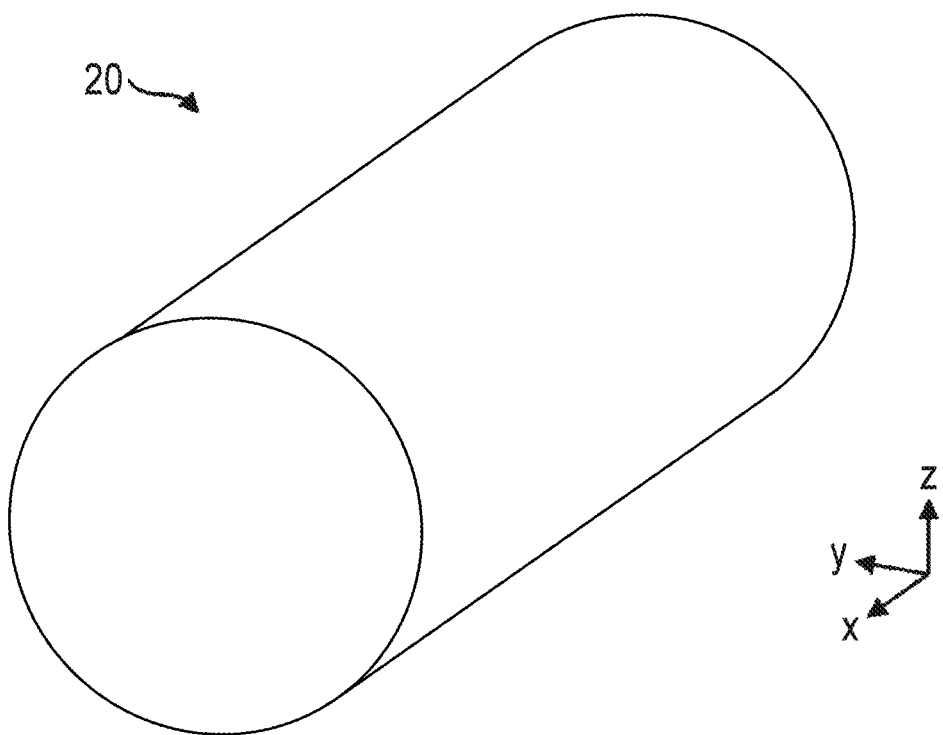
FIG. 26 is a perspective view of another embodiment of the secondary battery.

The cylindrical section 21 has a hollow shape with the opening portions 21a on two opposing sides. The opening portions 21a are provided on both sides of the cylindrical section 21 in the longitudinal direction. The shape of the cross section of the cylindrical section 21 in the width direction is rectangular. However, the cross-sectional shape of the cylindrical section is not limited thereto. FIG. 3A shows a plan view of the cylindrical section 21. FIG. 3B shows a cross-sectional view of the cylindrical section 21 in the width direction. FIG. 3C shows a side view of the cylindrical section 21 viewed from the width direction. FIG. 26 shows a perspective view of another embodiment of the secondary battery.

The cylindrical section 21 is constituted of a metal which has a high water vapor barrier property from the viewpoint of reducing deterioration of the power generation element. A metal which has a high water vapor barrier property is, for example, a metal which has a water vapor permeability of less than $1.0 \times 10^{-4}$ g/m²·24 h. A lower water vapor permeability indicates a higher water vapor barrier property. Examples of such metals include aluminum, stainless steel, SUS and duralumin. Aluminum may be used as the material of the cylindrical section 21 from the viewpoint of lightness and workability. Another advantage is that aluminum is inexpensive.

The water vapor permeability can be measured using the cup method based on JISZ0208 or the gas chromatography method based on JISK7129.

Here, from the viewpoint of reducing short-circuiting due to contact with the power generation element 10, the cylindrical section 21 may be subjected to the predetermined insulation treatment. For example, an insulation material, such as an insulation sheet, may be disposed between the power generation element 10 and the cylindrical section 21. An insulation material may be disposed between a surface of the power generation element 10 in the thickness direction and the cylindrical section 21. Further, the insulation material may be disposed between a surface of the power generation element 10 in the width direction and the cylindrical section 21. Thereby, electrical connection between the power generation element 10 and the cylindrical section 21 can be reduced, and short-circuiting of the secondary battery 100 can be reduced. Alternatively, a metal laminate film (for example, an aluminum laminate film) in which at least the inner surface of the cylindrical section 21 is covered with an insulation resin may be used. Thereby, electrical connection between the power generation element 10 and the cylindrical section 21 can be reduced, and short-circuiting of the secondary battery 100 can be reduced without requiring the disposition of the insulation material. The metal laminate film is a multilayer body in which the resin (for example, polypropylene, nylon, PET, etc.) is disposed on a surface of a metal layer. In such a manner, the insulation treatment may be performed such that the predetermined insulation layer is disposed on the inner circumferential portion of the cylindrical section 21.

However, a thickness of the metal layer of the general metal laminate film is usually about 0.04 mm, which is relatively thin and has a problem of low strength. Therefore, for example, the cylindrical section 21 is preferably constituted of metal with a thickness of 0.05 mm or greater and 0.2 mm or less, and more preferably constituted of metal with a thickness of 0.1 mm or greater and 0.2 mm or less. Alternatively, the metal laminate film that includes a metal layer which has a thickness within the range may be used as the cylindrical section 21. In a case where the metal laminate film is used for the cylindrical section 21, the metal laminate film formed into a cylindrical shape is used.

The cylindrical section 21 may have protrusion portions 21b at end portions in the longitudinal direction. Specifically, the cylindrical section 21 may be provided with a protrusion portion 21b on at least one of the surface in the thickness direction and the surface in the width direction at the end portion in the longitudinal direction. Since the protrusion portion 21b is provided, a function of ensuring a cementing area with the first resins 23 and improving a cementing strength is provided. The protrusion portion 21b refers to a part of the cover terminal 22 that protrudes outward from the substrate layer 22c.

Figure 4A:
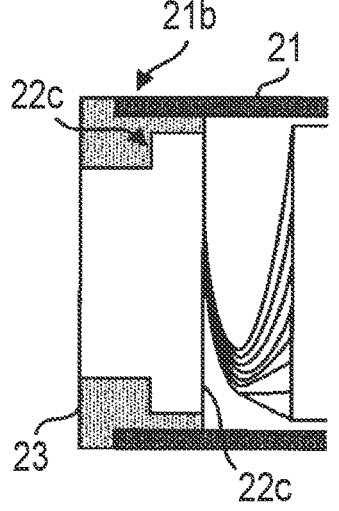
FIG. 4A is a cross-sectional view of a vicinity of an opening portion of the cylindrical section provided with a protrusion portion at each end portion of a surface in a thickness direction.
Figure 4B:
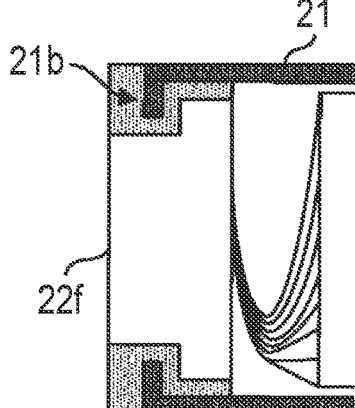
FIG. 4B is a cross-sectional view of a vicinity of an opening portion of the cylindrical section provided with a protrusion portion bent inward.

FIG. 4A shows a cross-sectional view of the vicinity of the opening portion 21a of the cylindrical section 21 provided with the protrusion portions 21b at the respective end portions of the surface in the thickness direction. Further, FIG. 4B shows a cross-sectional view of the vicinity of the opening portion 21a of the cylindrical section 21 provided with the protrusion portion 21b that is bent inward.

The cylindrical section 21 shown in FIG. 4A is provided with protrusion portions 21b at each end portion of the surface in the thickness direction. That is, the cylindrical section 21 has a structure in which the end portion of the surface in the thickness direction protrudes from the end portion of the surface of the cylindrical section 21 in the width direction. As shown in FIG. 4A, the cylindrical section 21 has the protrusion portion 21b. Therefore the cementing area with the first resins 23 can be increased, and the cementing strength can be improved. In other words, the first resins 23 can be suppressed from being peeled off. In a case where the first resins 23 is peeled off, the water vapor barrier property cannot be ensured, which is not desirable. Further, as shown in FIG. 4B, the protrusion portion 21b may have a shape bent toward the inner side of the cylindrical section 21. Thereby, it is easy to perform positioning of the cover terminals 22. In such a case, an opening portion formed of the two protrusion portions 21b is the opening portion 21a.

An angle between the protrusion portion 21b and the surface of the cylindrical section 21 (the surface which has the protrusion portion 21b) is not particularly limited, and can be any angle of 0° to 180°. For example, the angle is in a range of 15° to 135°. Although a length of the protrusion portion 21b is not particularly limited, the length is in a range of 0.5 mm to 2 mm, for example. However, the protrusion portion 21b is adjusted not to be higher than a surface 22f of the cover terminal 22 on the side of the opening portion 21a.

Cover Terminal 22

Figure 5A:
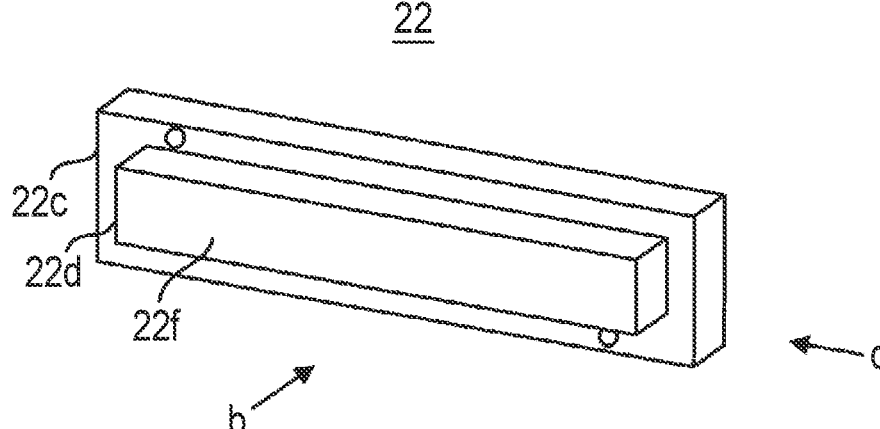
FIG. 5A is a perspective view of the cover terminal.
Figure 5B:
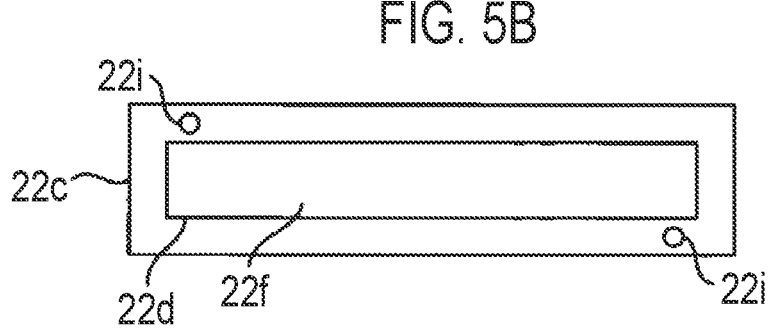
FIG. 5B is a front view of the cover terminal viewed from a direction b in FIG. 5A.
Figure 5C:
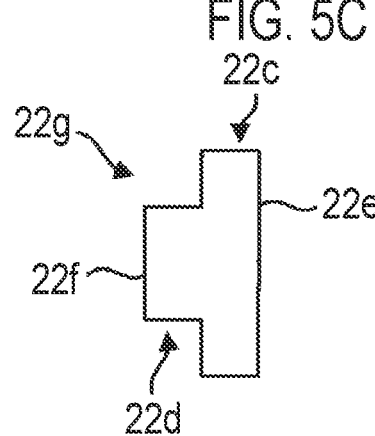
FIG. 5C is a side view of the cover terminal viewed from a direction c in FIG. 5A.

The cover terminals 22 (the positive electrode cover terminal 22a and the negative electrode cover terminal 22b) are disposed in the respective opening portions 21a of the cylindrical section 21 and function as covers for the cylindrical section 21. Each cover terminal 22 also functions as an electrode terminal of secondary battery 100. Thus, the cover terminal 22 is characterized by having two functions of a cover and an electrode terminal. FIG. 5A shows a perspective view of the cover terminal 22. FIG. 5B shows a front view of the cover terminal 22 observed from the direction b in FIG. 5A. FIG. 5C shows a side view of the cover terminal 22 observed from the direction c in FIG. 5A.

Figures 6, 7A, 7B:
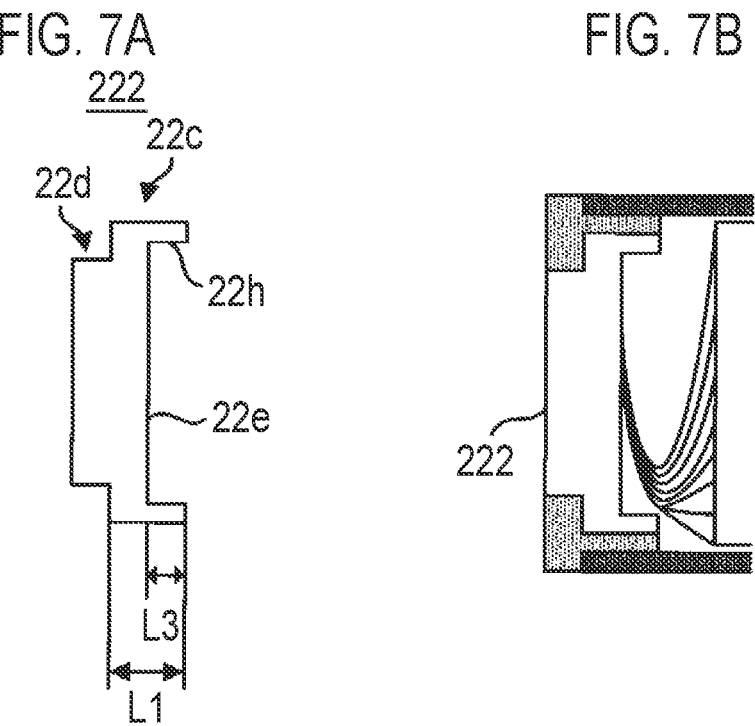
FIG. 6 is a diagram which shows an example of the cover terminal that does not have a projection portion.
FIG. 7A is a side view of the cover terminal in which protrusion portions are disposed at both end portions of the surface in the thickness direction.
FIG. 7B is a diagram which shows a usage example of the cover terminal.

The cover terminal 22 has a substrate layer 22c and a projection portion 22d which projects outward from the substrate layer 22c. The substrate layer 22c has a rectangular outer circumferential shape, and has a surface 22e that can be connected to each power collector 11 inside thereof. The projection portion 22d has a rectangular shape slightly smaller than the substrate layer 22c, and the projection portion 22d has the surface 22f on the outer side thereof for electrical connection to an external power source or power load. Further, the cover terminal 22 has a predetermined stepped portion 22g at a connection portion between the substrate layer 22c and the projection portion 22d. The stepped portion 22g is a combination of the outer circumferential portion of the projection portion 22d and an outer surface of the substrate layer 22c. However, the outer circumferential shape of the substrate layer 22c is not particularly limited as long as the substrate layer 22c has a shape along the cross-sectional shape of the cylindrical section 21 in the width direction. The outer circumferential shape of the projection portion 22d is also not particularly limited. Further, the cover terminal 22 may not have the projection portion 22d. In such a case, the outer surface of the substrate layer 22c is electrically connected to the external power source or power load. FIG. 6 shows an example of the cover terminal 122 without the projection portion 22d. The secondary battery according to the aspect of the present disclosure also includes such a configuration. Furthermore, the cover terminal 22 may have a plurality of projection portions 22d. The configuration will be described later.

Since the cover terminal 22 functions as an electrode terminal, the cover terminal 22 is constituted of an electrically conductive material. Further, since the cover terminal 22 functions as a cover for the cylindrical section 21, the cover terminal 22 is constituted of a material which has a high water vapor barrier property from the viewpoint of reducing deterioration of the power generation element 10. The material which has a high water vapor barrier property is, for example, a material which has a water vapor permeability of less than $1.0 \times 10^{-4}$ g/m$^2$·24 h. The material of the cover terminals 22 that satisfies the conditions is, for example, a metal. The metal that can be used for the cover terminals 22 is not particularly limited, but examples thereof include Cu, Ni, Cr, Au, Pt, Ag, Al, Fe, Ti, Zn, Co, and stainless steel. The metal which forms the cover terminals 22 may be the same as or different from the metal which forms the power collectors 11. Al is preferable as the metal which forms the positive electrode cover terminal 22a. Cu is preferable as a material which forms the negative electrode cover terminal 22b. Further, a part of the cover terminal 22 other than the part used for electrical connection may be constituted of a material other than the metal. For example, an aluminum film-integrated resin or a known resin may be used as the material of the part that is not used for electrical connection.

Here, from the viewpoint of reducing short-circuiting due to contact between the cover terminals 22 and the power generation element 10 and the cylindrical section 21, the predetermined insulation treatment may be performed. For example, an insulation material, such as an insulation sheet, may be disposed between the cover terminal 22 and the power generation element 10 (electrode laminate) from the viewpoint of reducing short-circuiting due to contact with the power generation element 10. Thereby, electrical connection between the power generation element 10 and the cover terminals 22 can be reduced, and short-circuiting of the secondary battery 100 can be reduced.

From the viewpoint of reducing short-circuiting due to contact between the cover terminal 22 and the cylindrical section 21, the metal laminate film in which at least the inner surface of cylindrical section 21 is covered with the insulation resin may be used. Thereby, electrical connection between the cover terminals 22 and the cylindrical section 21 can be reduced, and short-circuiting of the secondary battery 100 can be reduced without requiring disposition of an insulation material on the cover terminals 22. Further, in order to reduce short-circuiting due to contact with the cylindrical section 21, the outer circumferential portions of the cover terminals 22 (the outer circumferential portions of the substrate layer 22c and the stepped portion 22g) may be enveloped in the insulation film, an insulation tape may be attached onto the surface, or an insulation surface treatment may be applied. In such a manner, the insulation treatment may be performed such that the predetermined insulation layer is disposed on the outer circumferential portions of the cover terminals 22. The insulation treatment may be performed such that the predetermined insulation layer is disposed on the parts of the cover terminals 22 other than the surfaces 22e, 22f.

A length L1 of the substrate layer 22c of the cover terminal 22 is not particularly limited as long as the sufficient water vapor barrier property may be exhibited in a case where the cylindrical section 21 and the cover terminals 22 are integrated with the first resins 23. For example, the length L1 may be equal to or greater than 0.2 mm, equal to or greater than 0.5 mm, equal to or less than 3 mm, or equal to or less than 2 mm. A length L2 of the projection portion 22*d* of the cover terminal 22 is not particularly limited. However, as shown in FIG. 2, in a case where the first resin 23 is disposed on the outer circumferential portion of the projection portion 22*d* and the cylindrical section 21 and the cover terminal 22 are integrated by the first resin 23, the sufficient water vapor barrier property may be exhibited. For example, the length L2 may be equal to or greater than 0.5 mm, equal to or greater than 1 mm, equal to or less than 3 mm, or equal to or less than 2 mm.

In the laminate type battery of the related art, electrode terminals are disposed so as to protrude outward. The electrode terminal is usually made of a thin metal. Therefore, the surface disposed in the thickness direction of the electrode terminal is used for connection with an external member. On the other hand, the surface 22*f* of the cover terminal 22, which is disposed in the longitudinal direction, is used for connection with the external member. In some aspects, the surface 22*f* of the cover terminal 22 can be the to be a terminal obtained by changing the direction of the existing electrode terminal by 90 degrees. In such a manner, the cover terminal 22 has the surface 22*f* disposed in the longitudinal direction, and is thereby easily connected with the external member.

The cover terminals 22 are electrically connected to the power collectors 11 of the power generation element 10, but the connection method described above is not particularly limited. For example, the surface 22*e* of the cover terminal 22 and the power collectors 11 may be joined by a known joining method, such as press joining, laser joining, ultrasonic joining, or joining using a conductive material. Further, as shown in FIG. 2, the power collectors 11 may be curved in one direction and electrically connected to the cover terminals 22. It is possible to improve structural efficiency by electrically connecting the power collectors 11 to the cover terminals 22 in a curved state. This configuration will be described in detail below. Further, in a case where the power collectors 11 are in the curved state, force acts on the power collectors 11 in the direction in which the curved state is released. Therefore, since the cover terminals 22 are disposed in the direction in which the curved state of the power collectors 11 is released, the power collectors 11 are pressed against the cover terminals, and the connection between the power collectors 11 and the cover terminals 22 can be enhanced.

Further, the cover terminal 22 may have a protrusion portion 22*h* that protrudes inward from the end portion of the inner surface 22*e* of the substrate layer 22*c*. The protrusion portion 22*h* may be disposed on at least one end portion of the surface 22*e* (in either the thickness direction or the width direction), or may be disposed on a plurality of end portions. It is preferable that the protrusion portions 22*h* are disposed at opposing end portions of the surface 22*e*. It is more preferable that the protrusion portions 22*h* are disposed at respective end portions of the surface 22*e* in the thickness direction and the width direction. It is yet more preferable that the protrusion portion 22*h* is disposed on the entire outer circumference of the surface 22*e*. FIGS. 7A and 7B show an example of a cover terminal 222 in which protrusion portions 22*h* are disposed at both end portions of the surface 22*e* in the thickness direction. FIG. 7A is a side view of the cover terminal 222, and FIG. 7B is an example of how the cover terminal 222 is used. Thus, by having the protrusion portion 22*h* of the cover terminal 222, a contact area of the contact with the first resin 23 can be increased, and an adhesiveness with the cylindrical section 21 can be improved. Further, since the cover terminal 222 can effectively use the space surrounded by the surface 22*e* and the protrusion portion 22*h*, the structural efficiency of the secondary battery 100 can be improved. Although a length L3 of the protrusion portion 22*h* is not particularly limited, the length L3 may be, for example, equal to or greater than 0.5 mm, equal to or greater than 1 mm, equal to or less than 3 mm, or equal to or less than 2 mm.

In FIG. 2, the cover terminal 22 is used as an inner cover terminal disposed inside the opening portion 21*a* of the cylindrical section 21. However, the cover terminal according to the aspect of the present disclosure is not limited thereto, and an outer cover terminal may be disposed outside the opening portion 21*a* so as to cover the opening portion 21*a* of the cylindrical section 21. From the viewpoint of improving structural efficiency, the cover terminal 22 may be an inner cover terminal.

The width or the thickness of the cover terminal 22 may be less than or equal to the width or the thickness of the power generation element 10. The width or the thickness of the cover terminal 22 is the maximum value of the width or the thickness of the cover terminals 22, typically the width or the thickness of the substrate layer 22*c* of the cover terminals 22.

First, the width of the cover terminal 22 will be described. The width of the cover terminal 22 may be less than or equal to the width of the power generation element 10. In other words, the width of the power generation element 10 is made equal to or greater than the width of the cover terminals 22. Thereby, unnecessary space can be eliminated, and the structural efficiency can be further improved. In a similar manner, the thickness of the cover terminal 22 may be less than or equal to the thickness of the power generation element 10. In other words, the thickness of the power generation element 10 is made equal to or greater than the thickness of the cover terminal 22. Thereby, unnecessary space can be eliminated, and the structural efficiency can be further improved. A specific relationship between the widths and thicknesses of the power generation element 10, the cover terminals 22, and the cylindrical section 21 is as described above.

First Resin 23

The first resin 23 is disposed between the cylindrical section 21 and the cover terminal 22 to integrate the cylindrical section 21 and the cover terminals 22. The secondary battery 100 is able to ensure the sufficient water vapor barrier property by integrating the cylindrical section 21 and the inner cover terminals 22 with the first resins 23 in such a manner. Further, the first resin 23 may be used as an insulation member in a case of connecting the cover terminal 22 and the external member.

As shown in FIG. 2, each first resin 23 fills an interspace that is present between the cylindrical section 21 and the cover terminal 22. The "interspace that is present between the cylindrical section 21 and the cover terminals 22" is an interspace that is present between the inner surface of the cylindrical section 21 and the outer circumferential portion of the cover terminal 22. In order to form such an interspace, the cover terminals 22 may be made to have a size smaller than the size of the outer shape of the cylindrical section 21. For example, the interspace may be set in a range of 0.01 mm to 3 mm, and may be set in the range of 0.05 mm to 0.5 mm. Since the first resins 23 are disposed in the interspace as described above, the cylindrical section 21 and the cover terminals 22 are integrated with the first resins 23. Here, each first resin 23 may fill at least a part of the interspace that is present between the cylindrical section 21 and the cover terminal 22. However, from the viewpoint of ensuring the water vapor barrier property, it is preferable to fill the entire interspace as shown in FIG. 2. However, as will be described later, in a case where the inside of the cylindrical section 21 is filled with a second resin 24, in addition to the first resins 23, the second resin 24 may be disposed in the interspace formed between the cylindrical section 21 and the cover terminals 22.

Further, in a case where the cover terminal 22 has the projection portion 22d, the first resins 23 may be disposed not solely between the cylindrical section 21 and the cover terminal 22 but also on at least a part of the outer circumferential surface of the projection portion 22d. As shown in FIG. 2, the first resins 23 are disposed on the entire outer circumferential surface of the projection portion 22d, and each first resin 23 fill the stepped portion 22g formed by the substrate layer 22c and the projection portion 22d. That is, the first resin 23 may be disposed so as to fill the stepped portion 22g. In such a case, the surface of the first resins 23 on the side of the opening portion 21a may be disposed so as to be flat with the surface 22f of the cover terminal 22. Thus, by filling the stepped portion 22g formed by the substrate layer 22c and the projection portion 22d with the first resin 23, the water vapor barrier property can be enhanced.

In such a manner, in the exterior part 20, the path (interspace) through which water vapor enters from the outside is filled with the first resins 23. Therefore the water vapor can be sufficiently suppressed from entering into the interior of the exterior part 20. In other words, the exterior part 20 may have the interspace between the cylindrical section 21 and the cover terminals 22 through which the water vapor is able to enter. Such an interspace is filled with the first resins 23. Therefore, it is not necessary to tightly design the cylindrical section 21 and the cover terminals 22.

Here, the term "integration" means that each material is cemented with a resin and integrated therewith such an extent that the material and the resin can be recognized as one member. The term "integration" by the first resins 23 can be achieved by disposing the cylindrical section 21 which contains the power generation element 10 inside and the intermediate member which has the cover terminals 22 disposed in the opening portions 21a of the cylindrical section 21 in a predetermined mold and by injecting the first resin into the mold and curing the resin. Thus, the exterior part 20 can be manufactured by integral molding which uses the first resins 23.

In such a manner, the secondary battery 100 uses the exterior part 20 instead of the existing laminate exterior body to seal the power generation element 10, thereby having the water vapor barrier property equal to or stronger than that of the existing laminate exterior body. Further, in the existing laminate exterior body, sealing defects may occur in a case where the end portions of the power generation element are heat-adhered after the power generation element is housed therein. In such a case, since water vapor may enter from the defective sealing portion, the water vapor barrier property cannot be ensured. On the other hand, since the secondary battery 100 seals the power generation element 10 inside the exterior part 20 which uses the first resins 23, the defects due to sealing are highly unlikely to occur. Therefore, it is not necessary to inspect the water vapor barrier property (leak inspection) after the secondary battery 100 is manufactured.

As the first resin 23, a resin which has the water vapor barrier property is used from the viewpoint of reducing deterioration of the power generation element. The resin which has the water vapor barrier property is, for example, a resin which has a water vapor permeability of $1.0 \times 10^{-4}$ $g/m^2 \cdot 24$ h or greater and $50 \times 10^{-4}$ $g/m^2 \cdot 24$ h or less. Although the type of such resin is not particularly limited, for example, a thermoplastic resin can be mentioned. The thermoplastic resin is not particularly limited, and examples thereof include polypropylene and polyester.

Improvement in Structural Efficiency

Figure 8:
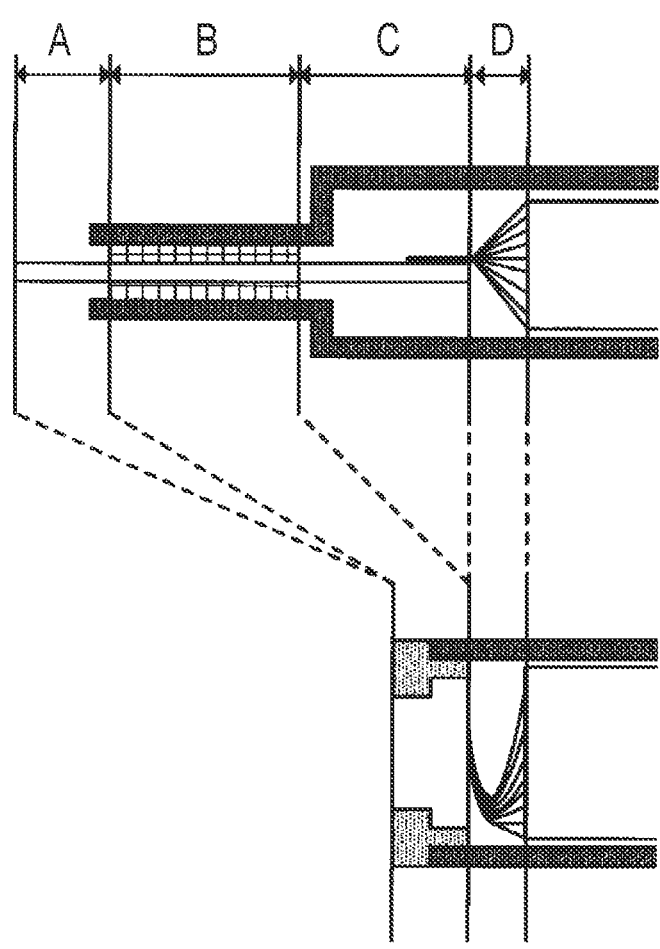
FIG. 8 is a diagram in which longitudinal cross-sectional views of an existing laminate type battery (upper drawing) and the secondary battery (lower drawing) are compared.
Figure 9:
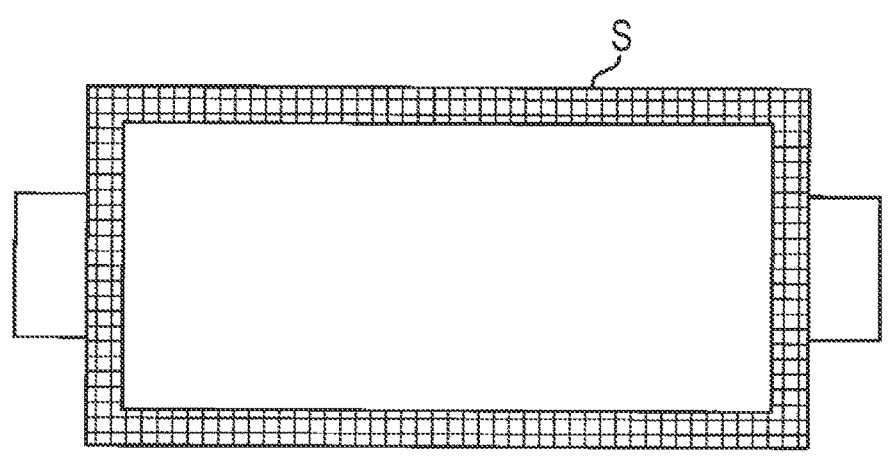
FIG. 9 is a plan view in which the existing laminate type battery (upper drawing) and a secondary battery (lower drawing) are compared.
Figure 9:
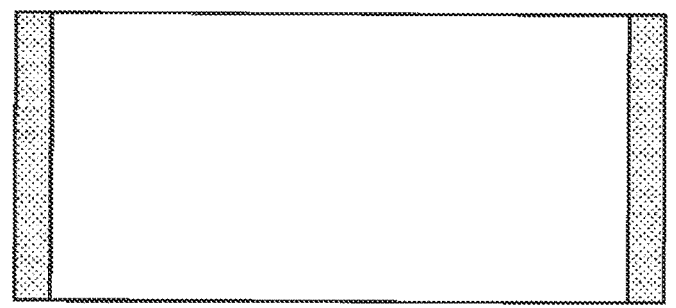

Next, improvement in structural efficiency obtained by the secondary battery 100 will be described. FIGS. 8 and 9 show diagrams in which the existing laminate type battery and the secondary battery 100 are compared. FIG. 8 is a diagram in which longitudinal cross-sectional views of the existing laminate type battery (upper drawing) and the secondary battery 100 (lower drawing) are compared. FIG. 9 is a plan view in which the existing laminate type battery (upper drawing) and the secondary battery 100 (lower drawing) are compared.

As shown in the upper drawing of FIG. 8, the existing laminate type battery includes a terminal part (region A) that protrudes from the laminate exterior body, a heat-adhered part (region B) in which the laminate exterior body is heat-adhered, a joined part (region C) in which the electrode terminal and the power collector are joined, and a power collector part (region D) in which a plurality of power collectors connected to power generation elements are present.

As shown in the lower drawing of FIG. 8, in the secondary battery 100, it is possible to shorten lengths of all regions by using the exterior part 20 as compared with the existing laminate type battery. Specific description thereof is as follows.

First, the reason why the length of the part corresponding to the region A is shortened will be described. Since the secondary battery 100 uses the cover terminals 22, the terminal part (surface 220 is perpendicular to the longitudinal direction. Therefore, the secondary battery 100 does not have a part corresponding to region A. Further, depending on the configuration of the first resin 23 disposed on the stepped portion 22g of the cover terminal 22, the projection portion 22d of the cover terminal 22 may be disposed so as to protrude from the first resin 23. Even in such a case, the part corresponding to the region A can be made extremely shorter than the existing laminate type battery.

Next, the reason why the length of the part corresponding to region B is shortened will be described. It is necessary for the region B (seal width) of the existing laminate type battery to be usually set as a length greater than 3 mm. The reasons for the above are as follows. (1) If the seal width is too short, it is difficult to achieve appropriate heat adhesion, which may result in sealing failure. (2) Since the laminate exterior body does not have high rigidity, if the seal width is short, the cementing of the sealing region may be peeled off due to an external impact, and the cemented surface may not be maintained. (3) At the time of heat adhesion, in a case where the terminal is not parallel to the cemented surface of the laminate exterior body, a short seal width weakens the correction force to restore the tilt. Hence, the heat adhesion cannot be performed appropriately, and the possibility of sealing failure increases. (4) At the time of heat adhesion, if the seal width is short, the pressure per unit area applied to the sealing region by the heat adhesion head increases. Thus, there is a risk that the metal layer inside the laminate exterior body may go over the insulation layer and dig into the terminal. In the case where the metal layer digs into the terminal, it is undesirable since this situation causes short-circuiting.

On the other hand, the secondary battery 100 uses the exterior part 20 in which the cylindrical section 21 and the cover terminals 22 are integrated with the first resins 23. Cementing failure between the cylindrical section 21 and the cover terminals 22 can be mostly reduced by integrating the cylindrical section 21 and the cover terminals 22 with the first resins 23 in such a manner. Further, even in a case where the cover terminals 22 are tilted and the cylindrical section 21 and the cover terminals 22 are not parallel, the cementing can be performed appropriately. Furthermore, since heat adhesion is not performed, short-circuiting is unlikely to occur. Further, since rigidity is ensured by performing the integration with the first resins 23, peeling of the cemented portion is also reduced. Therefore, in the secondary battery 100, a length (L1+L2) of the part corresponding to the region B of the existing laminate type battery can be set to be equal to or less than 3 mm. Further, the length (L1+L2) may be equal to or less than 2 mm or less, equal to or greater than 0.5 mm, or equal to or greater than 1 mm. Therefore, in the secondary battery 100, the length of the part corresponding to the region B can be shortened compared to the existing laminate type battery.

Next, the reason why a length of a part corresponding to the region C is shortened will be described. As shown in the lower drawing of FIG. 8, the surface 22e of the cover terminal 22 of the secondary battery 100 is perpendicular to the longitudinal direction. Therefore, power collectors 11 are joined to the surface 22e of the cover terminal 22 in a curved state. Therefore, a length of the joined part is extremely short. Therefore, in the secondary battery 100, the length of the part corresponding to the region C can be shortened compared to the existing laminate type battery.

Finally, the reason why a length of a part corresponding to the region D is shortened will be described. As described above, the power collectors 11 are joined to the surface 22e of the cover terminal 22 in a curved state. Therefore, a length of a part where the power collectors 11 are present is also extremely short. Therefore, in the secondary battery 100, the length of the part corresponding to the region D can be shortened compared to the existing laminate type battery.

Next, FIG. 9 will be described. As shown in FIG. 9, the existing laminate type battery requires heat-adhered parts S on maximum four sides of the outer circumference. On the other hand, both end portions of the secondary battery 100 in the longitudinal direction are made structurally efficient by the exterior part 20 as described above. Further, the secondary battery 100 uses the cylindrical section 21 that is a cylindrical metal body. Therefore, heat-adhered parts do not have to be present on both sides in the width direction. Therefore, the secondary battery 100 is structurally efficient in this respect. Further, since there are no heat-adhered parts on both sides in the width direction, the water vapor barrier property is also improved.

Advantages of the secondary battery 100 over the laminate type battery using a cover as described in JP 2-37661 A and JP 2011-108623 A will also be described herein. Even in the laminate battery which uses a cover, the lengths of regions A and D are the same as those of the existing laminate type battery. Further, the length of the region B is also equivalent to the length of the existing laminate type battery (seal width: length greater than 3 mm). The reason for the above is substantially the same as that of the existing laminate type battery, and the specific reason is as follows. (1) If the seal width is short, a sealing failure may occur. (2)

Since the laminate exterior body does not have high rigidity, if the seal width is short, the cementing of the sealing region may be peeled off due to an external impact, and the cemented surface may not be maintained. (3) Further, in a case where the cover is tilted due to an external impact, the correction force to restore the tilt is weakened, so the cemented surface may not be appropriately maintained. (4) In a case where the outer circumferential surface of the cover is not parallel to the adhered surface of the laminate exterior body during heat adhesion, the short seal width weakens the correction force to restore the tilt. Therefore, the probability of sealing failure increases. Furthermore, the length of the region C also depends on the configuration of the cover, but is equivalent to the length of the existing laminate type battery. In addition, in a case where the laminate exterior body is formed into a cylindrical shape, it may require sealing regions on the side surfaces. For the above-mentioned reasons, the secondary battery 100 has improved structural efficiency even compared to the laminate type battery which has the cover.

As described above, the secondary battery 100 is able to significantly improve the structural efficiency as compared with the existing laminate type battery.

Prevention of Short-Circuiting Between Power Generation Element 10 and Exterior Part 20

In a case where the cylindrical section 21 and the cover terminals 22 are made of metal, from the viewpoint of reducing short-circuiting due to contact between the power generation element 10 and the above-mentioned members, as described above, an insulation material may be disposed between the power generation element 10 and the members. A specific configuration of disposing the insulation material will be described below.

Figure 10:
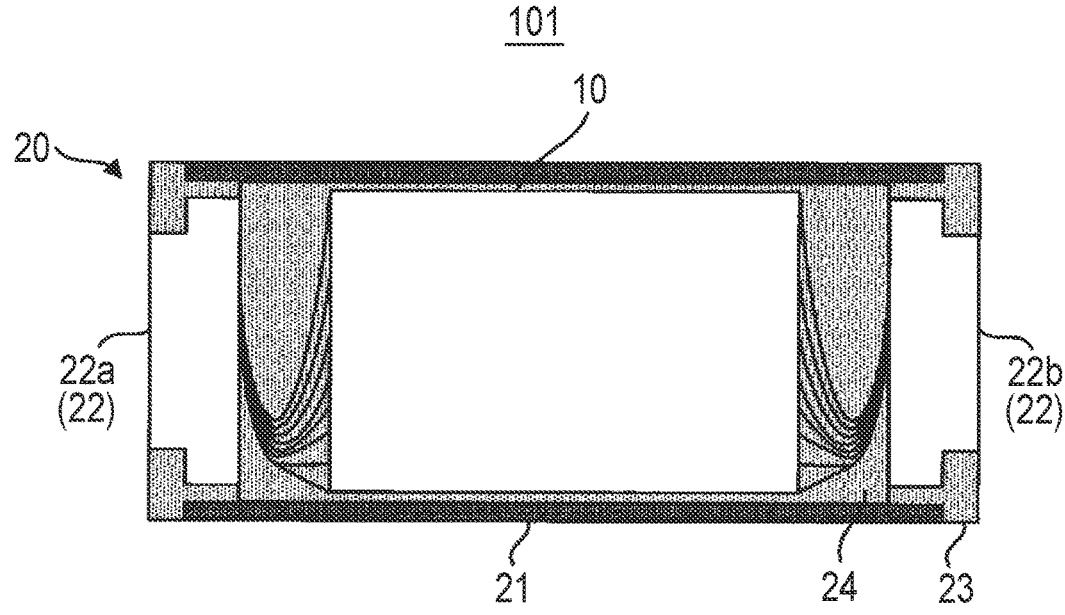
FIG. 10 is a longitudinal cross-sectional view of a secondary battery in which the entire inside of the exterior part is filled with a second resin.

First, the secondary battery 101 in which the exterior part 20 is filled with the second resin 24 will be described. FIG. 10 shows a longitudinal cross-sectional view of a secondary battery 101 in which the entire inside of the exterior part 20 is filled with the second resin 24.

As shown in FIG. 10, the exterior part 20 has a second resin 24 filled therein. The same resin as the first resin 23 can be used for the second resin 24. In FIG. 10, the second resin 24 is disposed on the entire inside of the exterior part 20, but is not limited thereto, and may be disposed at a position where the power generation element 10 and the exterior part 20 can come into contact with each other. It is preferable that the second resin 24 is disposed on the entire inside of the exterior part 20.

In such a manner, the exterior part 20 has the second resin 24 inside. Therefore the cylindrical section 21, the cover terminals 22, and the power generation element 10 can be integrated with the second resin 24. Thereby, short-circuiting due to contact between the power generation element 10 and the exterior part 20 can be reduced. For example, even in a case where the predetermined insulation layer is disposed on the power generation element 10 or the exterior part 20, the insulation layer may be broken by an external impact, and the power generation element 10 and the exterior part 20 may come into contact. As a result, short-circuiting may occur. On the other hand, by disposing the second resin 24 inside the exterior part 20, the contact between the power generation element 10 and the exterior part 20 can be more reliably reduced as compared with a case where solely the insulation layer is disposed. As a result, short-circuiting of the battery can be reduced.

Further, the secondary battery 101 can further improve the water vapor barrier property by providing the second resin 24. Furthermore, by integrating each member with the second resin 24, it is possible to reduce the movement of the power generation element 10 due to an external impact. Therefore, it is possible to reduce disconnection of the power collector 11 due to movement of the power generation element 10. Further, chipping and sliding of the power generation element 10 due to external impact can be reduced.

A method for filling the second resin 24 into the exterior part 20 is not particularly limited, but for example, a hole for injecting the second resin 24 may be provided at a predetermined position of the cylindrical section 21. The shape of the hole is not particularly limited, and may be circular, elliptical, or rectangular. At least one hole may be provided in the cylindrical section 21. For example, as shown in FIG. 3C, a plurality of holes 21c, 21d which have different shapes may be provided on the side surface of the cylindrical section 21. Further, at least one hole may be provided in the cover terminals 22. For example, as shown in FIG. 5B, the cover terminals 22 may be provided with a plurality of holes 22i. In a case where a power generation element for a liquid-based battery is used as the power generation element 10, after filling the second resin 24, a predetermined electrolytic solution may be injected from the hole.

Figure 11:
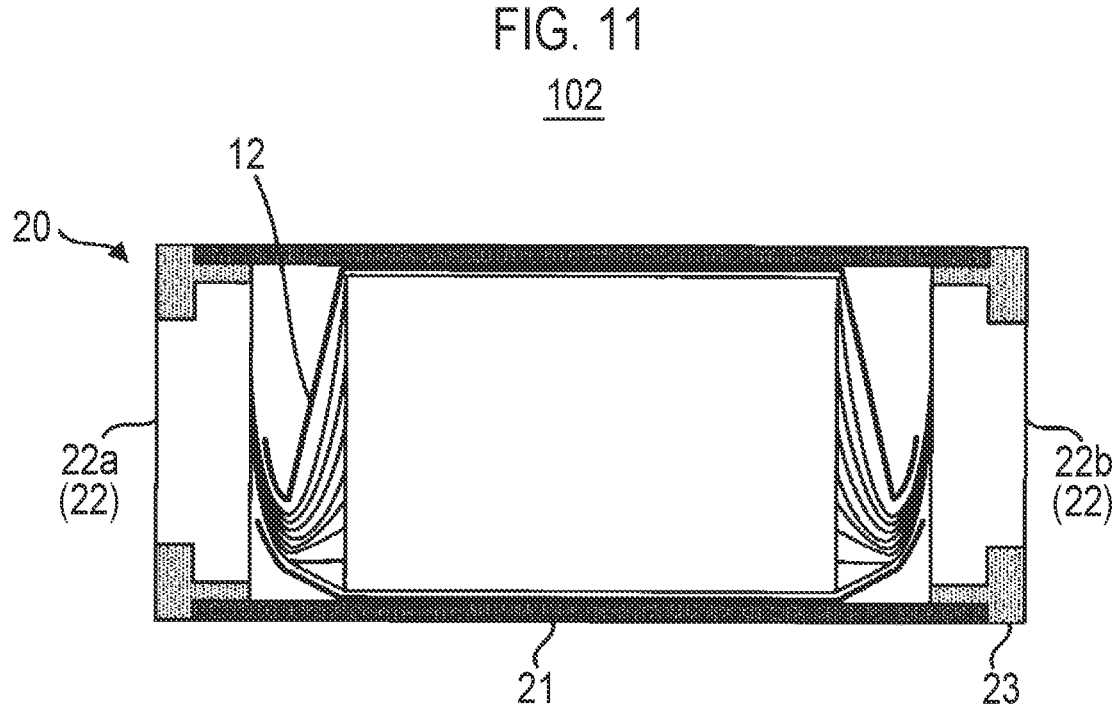
FIG. 11 is a longitudinal cross-sectional view of a secondary battery in which a power generation element is enveloped in a resin film.
Figure 12:
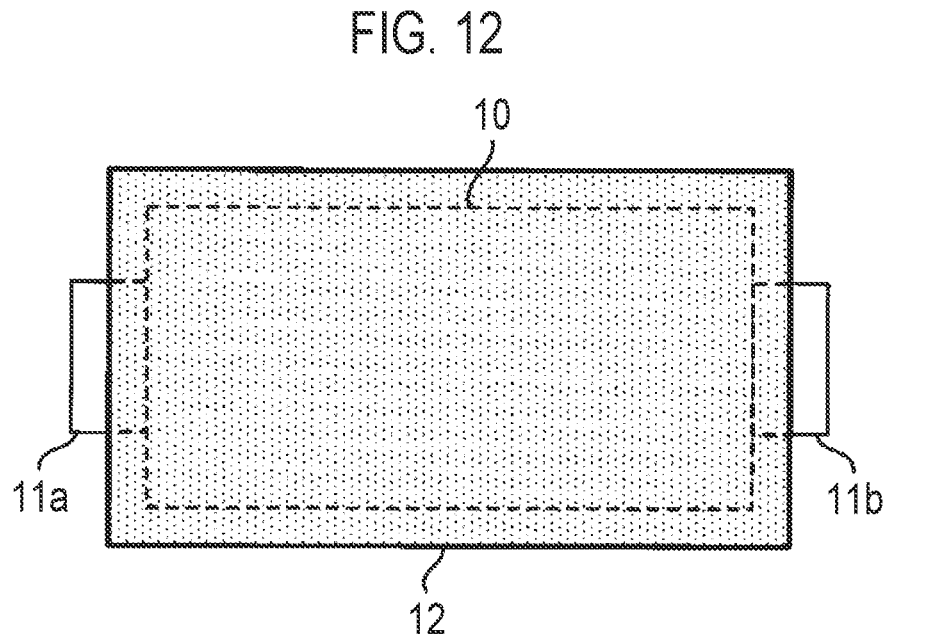
FIG. 12 is a plan view of the power generation element enveloped in the resin film.

Next, the secondary battery 102 in which the power generation element 10 is enveloped in the resin film 12 which has the insulation property and the water vapor barrier property will be described. FIG. 11 shows a longitudinal cross-sectional view of the secondary battery 102 in which the power generation element 10 is enveloped in the resin film 12. FIG. 12 shows a plan view of the power generation element 10 enveloped in the resin film 12.

As shown in FIGS. 11 and 12, the resin film 12 has a cylindrical shape and has an opening portion on the side where the cover terminal 22 is disposed. The resin film 12 envelops the entire power generation element 10 (excluding the power collectors 11, which are tabs). In FIG. 12, members disposed inside the resin film 12 are indicated by the dotted lines. It is possible to reduce short-circuiting due to contact between the power generation element 10 and the exterior part 20 (especially the cylindrical section 21) by enveloping the power generation element 10 entirely in the resin film 12 in such a manner. Further, by including the resin film 12 in the secondary battery 102, the water vapor barrier property can be further improved.

The resin film 12 may be any resin film which has the insulation property and the water vapor barrier property. For example, the resin film on which aluminum or silica is vapor-deposited can be used. Although the type of resin is not particularly limited, examples thereof include polypropylene and polyethylene terephthalate.

It should be noted that the power generation element 10 may be enveloped in the resin film 12 and the second resin 24 may be filled inside the exterior part 20.

Other Configurations of Cylindrical Section

From the viewpoint of improvement in structural efficiency, the cylindrical section 21 may be a cylindrical metal body or a cylindrical metal laminate film, as shown in FIGS. 3A, 3B, and 3C. The cylindrical metal body is preferable. On the other hand, there is a problem that it is difficult for the power generation element 10 to be housed inside such a cylindrical section. Therefore, the following cylindrical sections 121, 221 each of which easily houses the power generation element 10 may be used.

Figures 13A, 13B:
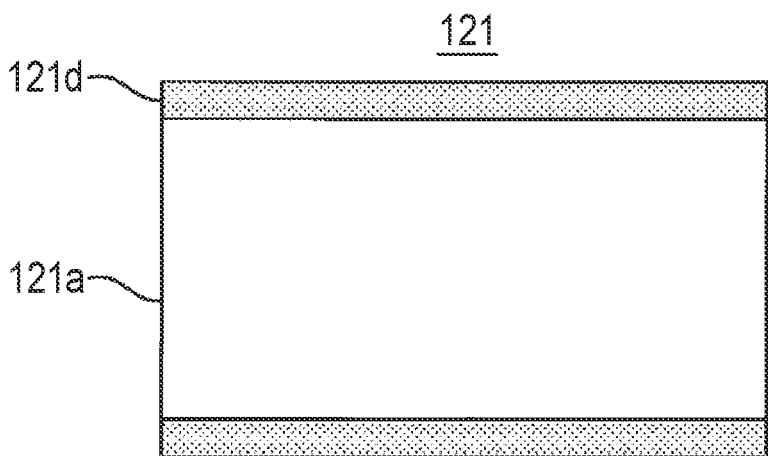
FIG. 13A is a plan view of the cylindrical section.
FIG. 13B is a cross-sectional view of the cylindrical section in the width direction.

First, the cylindrical section 121 will be described. FIG. 13A shows a plan view of the cylindrical section 121, and FIG. 13B shows a cross-sectional view of the cylindrical section 121 in the width direction. As shown in FIGS. 13A and 13B, the cylindrical section 121 is constituted of two metal plates 121a and a third resin 121d. Each metal plate 121a is a so-called U-shaped member which has a bottom surface 121b and protrusion portions 121c which protrude in the same direction from opposing end portions of the bottom surface 121b. As shown in FIG. 13B, the two metal plates 121a are superimposed upside down, and the protrusion portions 121c of the two metal plates 121a are superimposed on the opposing side surfaces (sides in the width direction) of the cylindrical section 121. The third resin 121d is disposed so as to cover each side surface of the cylindrical section 121. Specifically, the third resin 121d entirely covers the side surfaces of the protrusion portions 121c of the superimposed metal plates 121a and fills the interspaces between the protrusion portions 121c of the superimposed metal plates 121a. Thereby, the end portions of the superimposed metal plates 121a are integrated with the third resin 121d.

The cylindrical section 121 has two metal plates 121a. Therefore, after the power generation element 10 is disposed inside one of the metal plates 121a, the other metal plate 121a is disposed upside down, and the protrusion portion 121c of the metal plate 121a is superimposed and integrated with the third resin 121d. Thereby, the cylindrical section 121 can be manufactured. The power generation element 10 can be easily housed inside the cylindrical section 121 by using the cylindrical section 121 in such a manner.

Next, the cylindrical section 221 will be described. FIG. 14A shows a plan view of the cylindrical section 221, and FIG. 14B shows a cross-sectional view of the cylindrical section 221 in the width direction. As shown in FIGS. 14A and 14B, the cylindrical section 221 is constituted of one metal plate 221a and a third resin 221d. The metal plate 221a is formed in a cylindrical shape, and the end portion 221b of the metal plate 221a is superimposed on one side surface of the cylindrical section 221. The third resin 221d is disposed so as to cover the side surface where the end portion 221b is superimposed. Specifically, the third resin 221d entirely covers the side surfaces of the superimposed end portion 221b and fills the interspace between the superimposed end portion 221b of the metal plate 221a. Thereby, the end portion 221b of the superimposed metal plate 221a is integrated with the third resin 221d.

The cylindrical section 221 is constituted of one metal plate 221a. Therefore, after the power generation element 10 is disposed inside the cylindrical metal plate 221a, the end portion 221b is integrated with the third resin 221d. Thereby, the cylindrical section 221 can be manufactured. The power generation element 10 can be easily housed inside the cylindrical section 221 by using the cylindrical section 221 in such a manner. Further, as shown in FIG. 15, by bringing the side surface of the cylindrical section 221, on which the third resin 221d is not disposed, into contact with the predetermined cooling portion X, the secondary battery can be easily cooled. It should be noted that such a cooling mode can also be applied to the secondary battery that uses the cylindrical section 21.

The metal plate used in the above-mentioned two configurations may be a simple metal plate or a metal laminate film. The metal plate was used in the embodiment shown in the drawing. The type of metal may be a metal which has a high water vapor barrier property. The same resin as the first resins 23 can be used as the third resin used in the above-mentioned two configurations. Further, "integration" performed by the third resin can be achieved by disposing the superimposed metal plates 121a or the metal plate 221a formed into a cylindrical shape in a predetermined mold, injecting the third resin into the mold, and curing the third resin. Thereby, the cylindrical sections 121, 221 can be manufactured.

Other Configurations of Cover Terminal

From the viewpoint of further improving the structural efficiency of the secondary battery 100, cover terminals 322 each of which has a slit portion 322*j* may be used instead of the cover terminals 22. A secondary battery 103 that has the cover terminals 322 each of which has the slit portion 322*j* will be described below.

Figure 16:
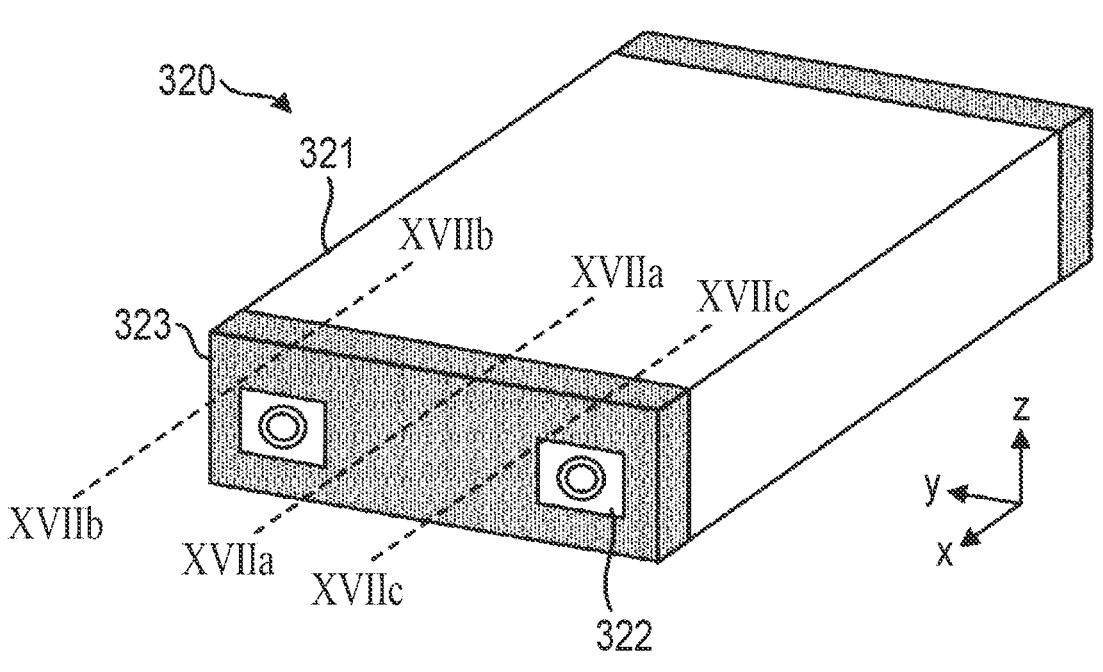
FIG. 16 is a perspective view of a secondary battery.
Figure 17A:
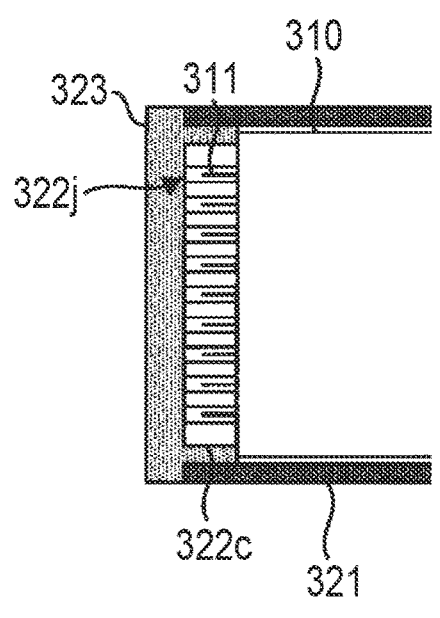
FIG. 17A is a longitudinal cross-sectional view taken along the line XVIIa-XVIIa of FIG. 16.
Figure 17A:
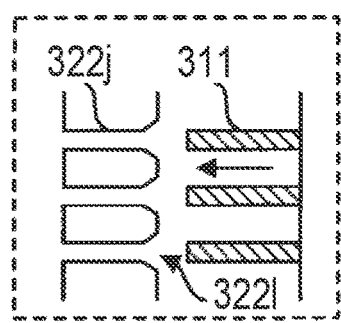
Figure 17B:
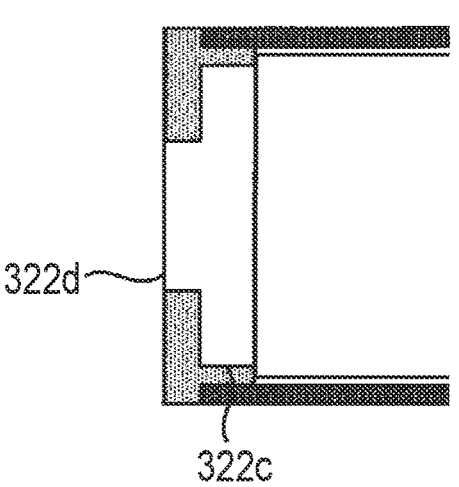
FIG. 17B is a longitudinal cross-sectional view taken along line XVIIb-XVIIb of FIG. 16.
Figure 17C:
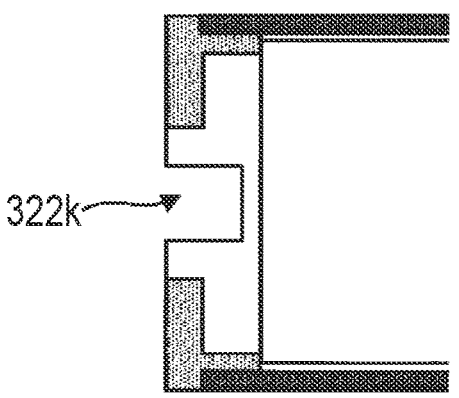
FIG. 17C is a longitudinal cross-sectional view taken along line XVIIc-XVIIc of FIG. 16.
Figure 18A:
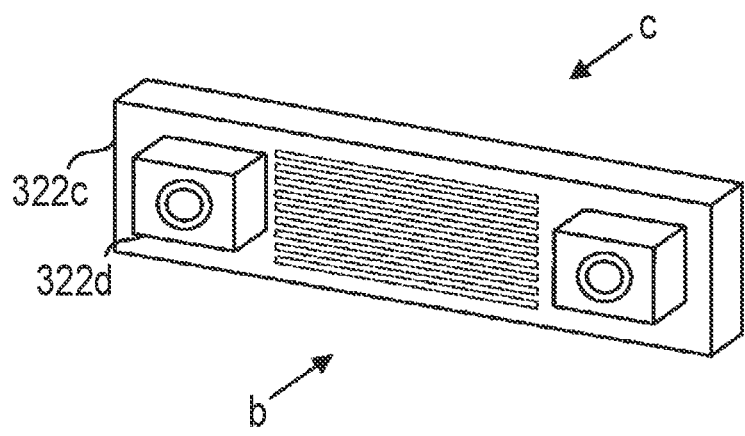
FIG. 18A is a perspective view of the cover terminal.
Figure 18B:
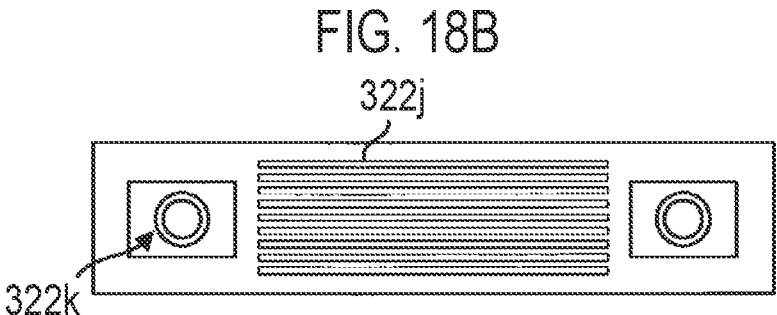
FIG. 18B is a front view of the cover terminal viewed from the direction b in FIG. 18A.
Figure 18C:
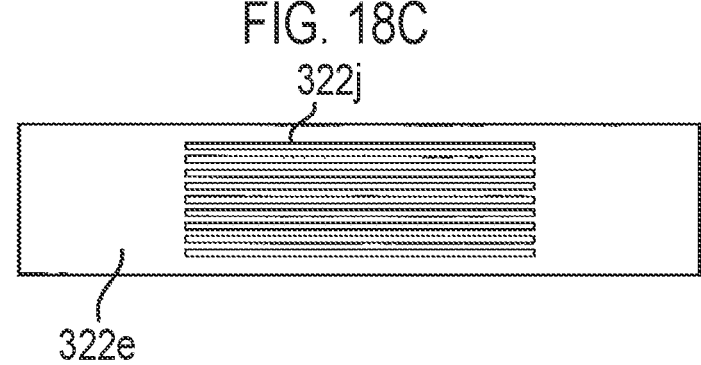
FIG. 18C is a rear view of the cover terminal viewed from the direction c in FIG. 18A.

FIG. 16 shows a perspective view of the secondary battery 103. FIG. 17A is a longitudinal cross-sectional view taken along the line XVIIa-XVIIa of FIG. 16. FIG. 17B is a longitudinal cross-sectional view taken along XVIIb-XVIIb of FIG. 16. FIG. 17C is a longitudinal cross-sectional view taken along the line XVIIc-XVIIc of FIG. 16. FIG. 18A shows a perspective view of a cover terminal 322. FIG. 18B shows a front view of the cover terminal 322 observed from the direction b in FIG. 18A. FIG. 18C shows a rear view of the cover terminal 22 observed from the direction c in FIG. 18A.

The secondary battery 103 differs from the secondary battery 100 mainly in the following points. That is, a power generation element 310 has a plurality of power collectors 311, an inner surface 322*e* of the cover terminal 322 has a plurality of slit portions 322*j*, and the power collectors 311 are disposed in the slit portions 322*j*. Thereby, the power collectors 311 and the cover terminal 322 are electrically connected. With such a configuration, a distance between the power generation element 310 (electrode laminate) and the cover terminal 322 can be shortened, and the structural efficiency can be further improved. Detailed effects will be described later.

In the configuration of the power generation element 310, the curved power collectors 11 of the power generation element 10 described above are changed to straight power collectors 311. Thereby, the power collectors 311 can be inserted and disposed in the slit portion 322*j* as shown in the dotted line frame in FIG. 17A. Here, in FIG. 17A, the power generation element 310 has a plurality of power collectors 311. However, the secondary battery according to the aspect of the present disclosure is not limited thereto, and at least one power collector 311 may be provided.

The cover terminal 322 has a substrate layer 322*c* and projection portion 322*d* disposed at the end portion of the substrate layer 322*c* in the width direction. The projection portion 322*d* has a substantially circular recess portion 322*k* to facilitate connection with an external member. The recess portion 322*k* may be, for example, a screw hole for connection with the external member, a straight hole for positioning, or a straight hole for press-fitting or connection of the rivet or the like. Further, as shown in FIGS. 17A and 18C, the inner surface 322*e* of the substrate layer 322*c* of the cover terminal 322 has a plurality of slit portions 322*j*. Since the power collectors 311 are disposed in the slit portions 322*j*, the power collectors 311 and the cover terminal 322 are electrically connected.

The secondary battery 103 employs the cover terminal 322 which has two projection portions 322*d*. However, the configuration of the cover terminal is not limited thereto, and there is no particular limitation on the configuration of the outer side as long as the inner surface 322*e* of the cover terminal 322 has the slit portions 322*j*. Further, the secondary battery 103 uses the cover terminal 322 which has a plurality of slit portions 322*j*, but the number of the slit portions 322*j* may be at least one.

The slit portions 322*j* extend through the cover terminal 322 in the longitudinal direction, and the power collectors 311 are disposed therein. However, the slit portions 322*j* do not have to be penetrated. Whether or not the slit portions 322*j* are penetrated can be appropriately set in accordance with the method of joining the slit portions 322*j* to the power collectors 311.

The power collectors 311 may be inserted from the inner surface 322*e* of the cover terminal 322, or may be inserted from the side surface (side in the thickness direction or width direction). That is, the substrate layer 322*c* of the cover terminal 322 may have the opening portions 322*l* of the slit portions 322*j* on the side surface. A thickness of each slit portion 322*j* is not particularly limited as long as the thickness allows the power collectors 311 to be disposed thereon. For example, the thickness is equal to or greater than 0.1 μm and equal to or less than 1 mm. The slit portion 322*j* has an opening portion 322*l* for inserting the power collector 311. Therefore, in order to facilitate the insertion of the power collector 311, the opening portion 322*l* may have a shape wider in the thickness direction than the inside (for example, V-shaped). FIG. 17A shows how the power collectors 311 are inserted from the inner surface 322*e* of the cover terminal 322 within the dotted line.

Figure 19A:
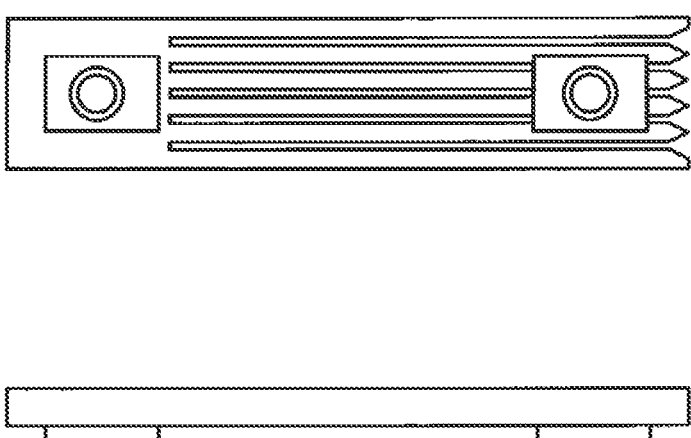
FIG. 19A is a front view and a plan view of a cover terminal provided with a slit portion for inserting a power collector from the side surface, and shows an example of a cover terminal which has two projection portions.
Figure 19B:
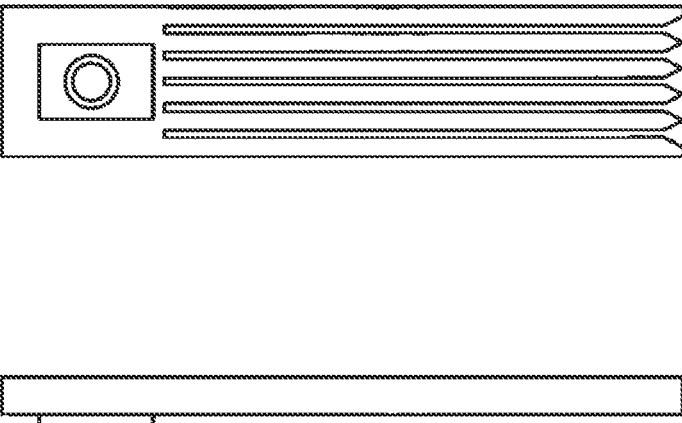
FIG. 19B is a front view and a plan view of a cover terminal provided with a slit portion for inserting a power collector from the side surface, and shows an example of the cover terminal which has one projection portion.

FIGS. 19A and 19B show a front view and a plan view of the cover terminal provided with slit portions for inserting the power collectors 311 from the side surface. FIG. 19A is an example of the cover terminal which has two projection portions. FIG. 19B is an example of the cover terminal which has one projection portion. As shown in FIG. 19A, it is technically possible to provide the slit portions on the rear side of the projection portion, but this configuration is likely to cause trouble. Therefore, as shown in FIG. 19B, in general, projection portions solely at positions that do not superimpose the slit portions are provided.

In a case where the cover terminal 322 has the slit portions 322*j* which penetrate therethrough in the longitudinal direction, a first resin 323 may be disposed so as to cover the entire outer opening portion of each slit portion 322*j*. For example, as shown in FIG. 16, the first resin 323 may be disposed to cover the entire outer surface of the substrate layer 322*c*. Thereby, outside air (water vapor) can be suppressed from entering the interior of the exterior part 320 through the slit portions 322*j*. Further, the first resin 323 may enter the slit portions 322*j* and at least a part of the inside thereof may be filled with the first resin 323.

The configuration of connection between the power collectors 311 and the cover terminal 322 is not particularly limited, and the power collectors 311 may be simply disposed in the slit portions 322*j*. However, from the viewpoint of strengthening the connection between the power collectors 311 and the cover terminal 322, the slit portions 322*j* (cover terminal 322) and the power collectors 311 may be joined in a state where the power collectors 311 are disposed in the slit portions 322*j*. The joining method is not particularly limited, and known joining methods, such as press joining, laser joining, ultrasonic joining, and conductive material fixing methods can be employed. In a case where the slit portions 322*j* penetrate through the cover terminal 322, laser joining or the conductive material fixing method may be adopted. In a case where the slit portions 322*j* do not penetrate through the cover terminal 322, press processing or ultrasonic processing may be employed.

Here, the slit portion 322*j* will be further described. FIG. 17A shows a configuration in which one power collector is disposed in one slit portion 322*j*. With such a configuration, a distance between the power generation element 310 (electrode laminate) and the cover terminal 322 can be shortened. It is also possible to make the distance between the power generation element 310 (electrode laminate) and the cover terminal 322 substantially zero or zero (refer to FIG. 17A). On the other hand, depending on the shape of the cover terminal 322, it may be difficult for one power collector to be disposed in one slit portion 322*j*. Therefore, two or more power collectors may be disposed in one slit portion 322*j*. For example, in one slit portion 322*j*, two power collectors may be disposed, three power collectors may be disposed, or four power collectors may be disposed. However, as the number of power collectors 311 disposed in one slit portion 322*j* increases, the distance between the power generation element 310 and the cover terminal 322 may increase. Therefore, the number of power collectors disposed in one slit portion 322*j* may be equal to or less than 10, or may be equal to or less than 8.

Figure 20:
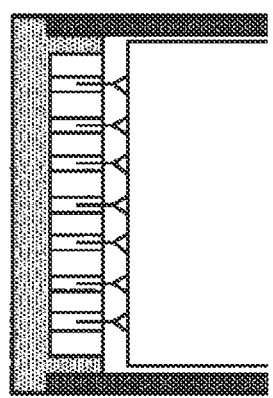
FIG. 20 is a diagram which shows an example of a configuration in which two power collectors are disposed in one slit portion.

FIG. 20 shows an example in which two power collectors 311 are disposed in one slit portion 322*j*. As shown in FIG. 20, in a case where two power collectors 311 are disposed in one slit portion 322*j*, a region for superimposing the two power collectors 311 is necessary. The region tends to increase as the number of power collectors 311 to be superimposed increases. Therefore, from the viewpoint of improving structural efficiency, the smaller the number of power collectors 311 disposed in one slit portion 322*j*, the better, and a most preferable configuration is that one power collector 311 is disposed in one slit portion 322*j*.

A distance between the cover terminal 322 and the power generation element 310 (electrode laminate) is not particularly limited, and the closer the distance, the better the structural efficiency. However, for example, the distance may be equal to or less than 2 mm, may be equal to or less than 0.5 mm, or may be 0 mm, that is, the cover terminal 322 and power generation element 310 may be in contact with each other. However, in a case where the cover terminal 322 and the power generation element 310 are in contact with each other, it is necessary for at least one of the cover terminal 322 and the power generation element 310 to be subjected to the predetermined insulation treatment.

FIG. 18C shows a configuration in which the slit portions 322*j* are disposed side by side in the thickness direction. The reason for the above is that the power collectors 311 of the power generation element 310 are disposed side by side in the thickness direction. Thus, the arrangement direction of the slit portions 322*j* can be set along the arrangement direction of the power collectors 311 of the power generation elements 310. Therefore, in the secondary battery according to the aspect of the present disclosure, the arrangement direction of the slit portions is not limited to the thickness direction, and can be appropriately set in accordance with the arrangement direction of the power collectors of the power generation elements.

Further, as shown in FIG. 18C, the slit portions 322*j* are disposed in the center of the inner surface 322*e* of the substrate layer 322*c* in order to avoid the recess portion 322*k* of the projection portion 322*d*. Therefore, in the secondary battery according to the aspect of the present disclosure, the position of the slit portions is not particularly limited, and can be appropriately set in accordance with a shape of the cover terminal and the like.

As described above, by using the cover terminal 322 which has the slit portions 322*j*, the distance between the cover terminal 322 and the power generation element 310 (electrode laminate) can be shortened. On the other hand, in a case where the distance between the cover terminal 322 and the power generation element 310 (electrode laminate)

is shortened, a problem of short-circuiting due to contact occurs. Therefore, the cover terminal 322 may be subjected to the predetermined insulation treatment.

The insulation treatment of the cover terminal 322 is not particularly limited, but for example, an outer circumferential portion of the cover terminal 322 may be enveloped in the insulation film, an insulation tape may be applied to the outer circumferential portion of the cover terminal 322, or an insulation sheet may be disposed on the outer circumferential portion of the cover terminal 322. In such a manner, the insulation treatment may be performed such that the predetermined insulation layer is disposed on the outer circumferential portions of the cover terminals 322. In particular, the insulation sheet may be disposed between the power generation element 310 (electrode laminate) and the cover terminal 322 from the viewpoint of reducing short-circuiting due to contact between the power generation element 310 and the cover terminal 322. Examples of the insulation sheet include polyethylene terephthalate (PET), polyolefin (PO), such as polyethylene (PE) and polypropylene (PP), and an insulation resin, such as fluororesin.

Figure 21A:
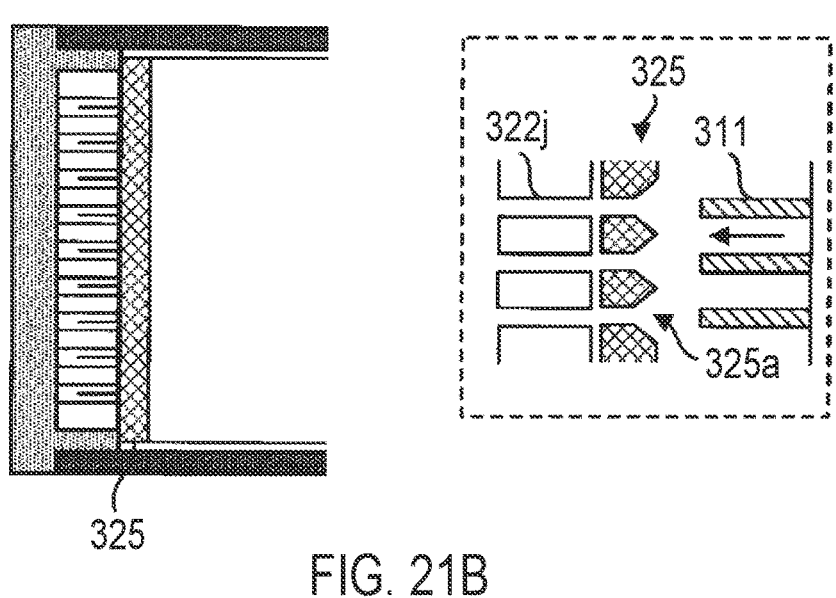
FIG. 21A is a diagram which shows an example of a configuration in which an insulation sheet is disposed between the power generation element and the cover terminal.

FIG. 21A shows a configuration in which an insulation sheet 325 is disposed between the power generation element 310 and the cover terminal 322. Since the power collectors 311 are disposed in the slit portions 322*j*, the insulation sheet 325 has opening portions 325*a* through which the power collectors 311 pass. The opening portions 325*a* of the insulation sheet 325 also function as a guide for inserting the power collectors 311 into the slit portions 322*j*. The positions and number of the opening portions 325*a* are set in accordance with the positions and number of the slit portions 322*j*. Further, as shown in the dotted line of FIG. 21A, the insulation sheet 325 has the opening portions 325*a* for inserting the power collectors 311. The opening portions 325*a* may have a shape (for example, a V shape) that is wider in the thickness direction than the inside in order to facilitate insertion of the power collectors 311. In a case where the power collectors 311 are inserted from the side surface of the cover terminal 322, the insulation sheet 325 also has an opening portion on the side surface.

Figure 21B:
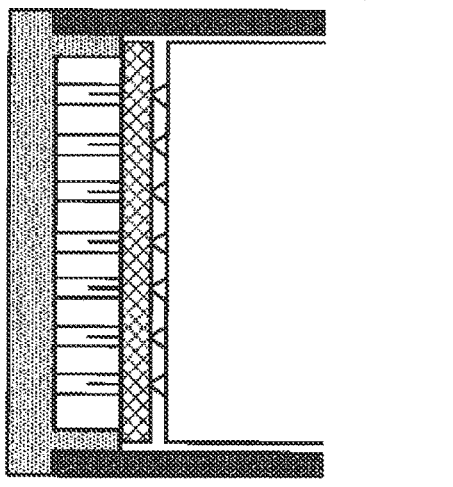
FIG. 21B is a diagram which shows an example of a configuration of disposition of the insulation sheet in a case where two power collectors are disposed in one slit portion.
Figure 21C:
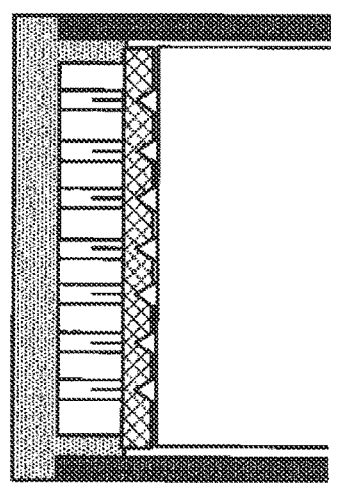
FIG. 21C is a diagram which shows an example of a configuration of disposition of the insulation sheet in which two power collectors are disposed in one slit portion and the opening portion of the slit portion in the insulation sheet has a wide shape in the thickness direction.
Figure 22:
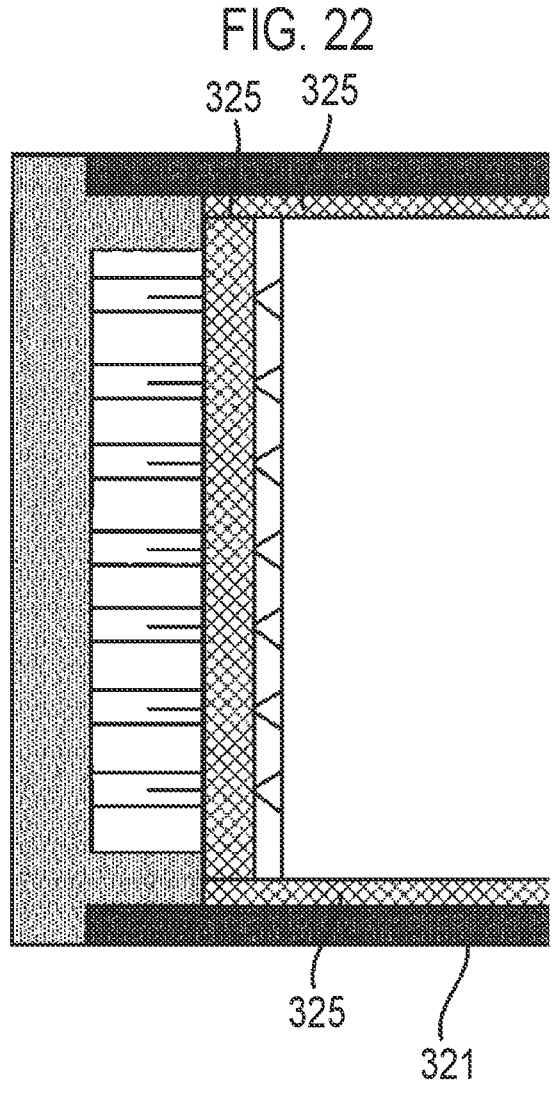
FIG. 22 is a diagram which shows an example of a configuration in which the insulation sheet is disposed between the surface of the power generation element in the thickness direction and the inner surface of the cylindrical section in the thickness direction.

Further, FIG. 21B shows an example of a configuration of disposition of the insulation sheet 325 in a case where two power collectors 311 are disposed in one slit portion 322*j*. In such a manner, even in a case where two or more power collectors 311 are disposed in one slit portion 322*j*, the insulation sheet 325 can be disposed between the power generation element 310 and the cover terminal 322. Here, in a case where each opening portion 325*a* of the insulation sheet 325 has a wide shape in the thickness direction, a region where the power collectors 311 are superimposed can be disposed inside the opening portion 325*a*. Therefore, even in a case where two or more power collectors 311 are disposed in one slit portion 322*j*, a distance between the insulation sheet 325 and the power generation element 310 (electrode laminate) can be shortened. FIG. 21C shows an example of a configuration of disposition of the insulation sheet 325 in a case where two power collectors 311 are disposed in one slit portion 322*j* and each opening portion 325*a* of the insulation sheet 325 has a wide shape in the thickness direction. As shown in FIG. 21C, the power generation element 310 (electrode laminate) can be disposed at a position that has substantially contact with or that has contact with the insulation sheet 325.

The insulation sheet 325 may be disposed between the surface of the power generation element 310 in the width direction or the thickness direction and the inner surface of the cylindrical section 321 in the width direction or the thickness direction for insulation between the power generation element 310 and the cylindrical section 321. Alternatively, the insulation sheet 325 may be disposed between the surface of the power generation element 310 in the width direction and the thickness direction and the inner surface of the cylindrical section 321 in the width direction and the thickness direction. FIGS. 21A, 21B, and 21C show an example of a configuration in which the insulation sheet 325 is disposed between the surface of the power generation element 310 in the thickness direction and the inner surface of the cylindrical section 321 in the thickness direction.

Improvement in Structural Efficiency

Figure 23:
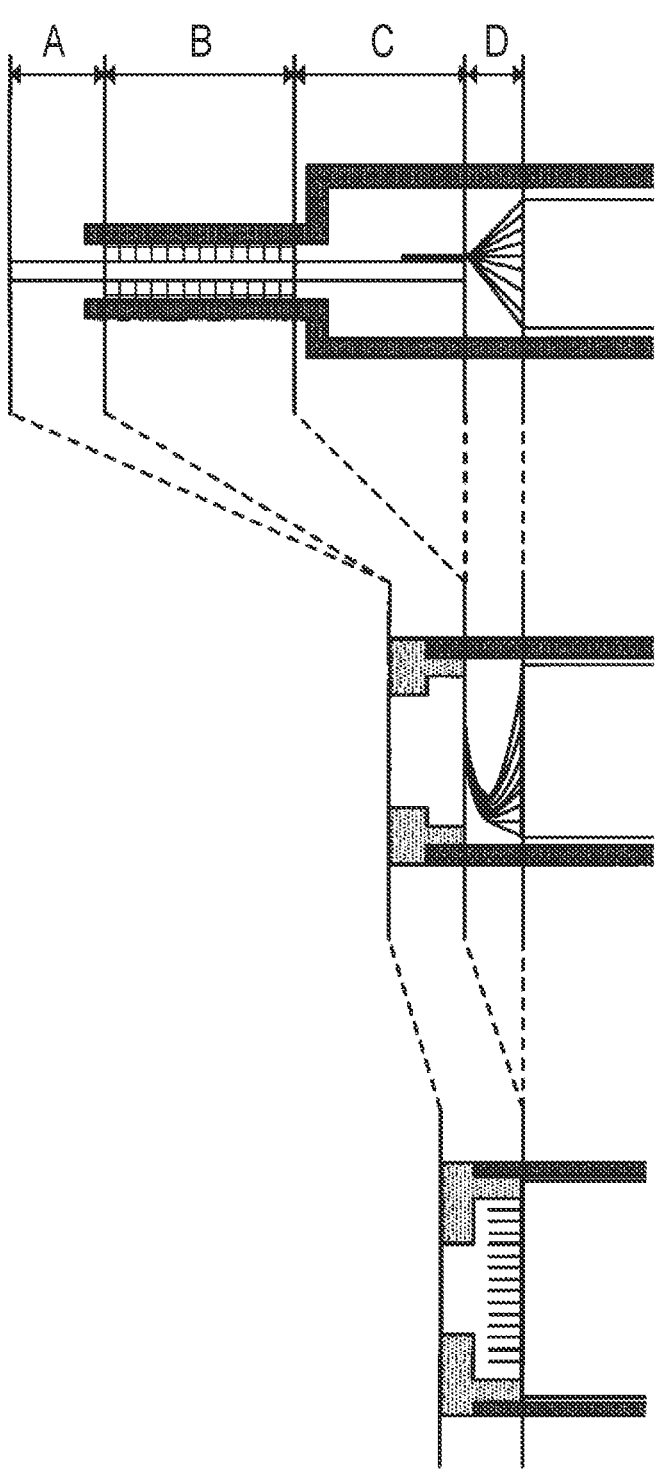
FIG. 23 is a diagram in which longitudinal cross-sectional views of the existing laminate type battery (upper drawing), the secondary battery (second drawing), and a secondary battery (lower drawing) are compared.

Improvement in structural efficiency of the secondary battery 103 will be described. FIG. 23 is a diagram in which the secondary battery 103 in the longitudinal cross-sectional view is added in the lower drawing and longitudinal cross-sectional views of the existing laminate type battery in the upper drawing, the secondary battery 100 in the second drawing, and the secondary battery 103 in the lower drawing are compared, the diagram corresponding to FIG. 8. It should be noted that the power collectors are shown in the secondary battery 103 shown in the diagram below for easy comparison.

The comparison results between the laminate type battery and the secondary battery 100 are as described above. Therefore, the secondary battery 100 and the secondary battery 103 are compared and examined herein. As can be seen from FIG. 23, the secondary battery 103 has a shorter region D than the secondary battery 100. The reason for the above is as follows. In the secondary battery 100, the power collectors 11 are curved and joined to the cover terminals 22, whereas in the secondary battery 103, the power collectors 311 are disposed in the slit portions 322*j* of the cover terminals 332, and the distance between the cover terminal 322 and the power generation element 310 can be further shortened. Therefore, with the secondary battery 103, the structural efficiency can be further improved. Further, with the improvement in structural efficiency, it is possible to reduce presence of excess space inside the exterior part 320. Therefore the rigidity of the secondary battery 103 can be improved.

Resin Filling Inside

Figure 24:
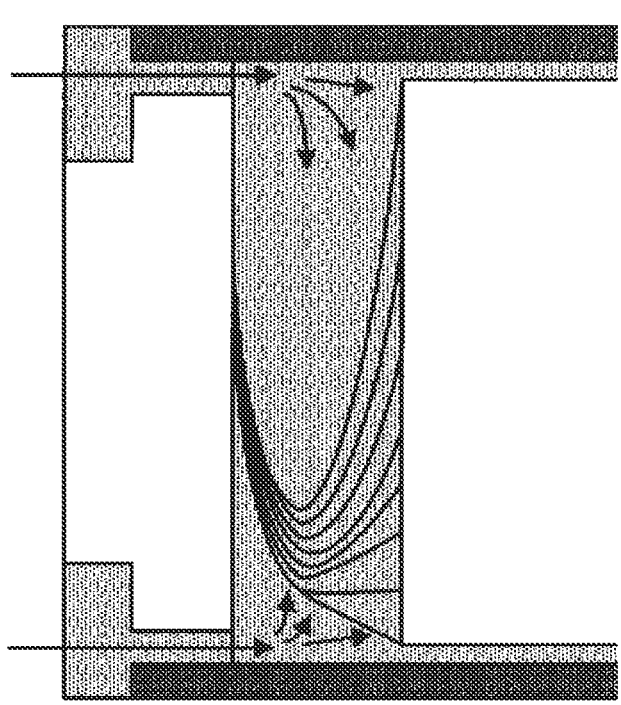
FIG. 24 is a diagram for illustrating water vapor diffusion inside a resin.

In the case where the inside of the secondary battery 103 is filled with the second resin 324, the second resin 324 may be disposed on the entire inside of the exterior part 320. However, since water vapor diffuses inside the resin although the resin has a minute amount, there is a possibility that external water vapor diffuses inside the first resin and the second resin and reaches the end portion surface of the power generation element. Specifically, as shown in FIG. 24, water vapor may reach the surface in the longitudinal direction of the power generation element 310 (electrode laminate) closest to the first resin.

Figure 25A:
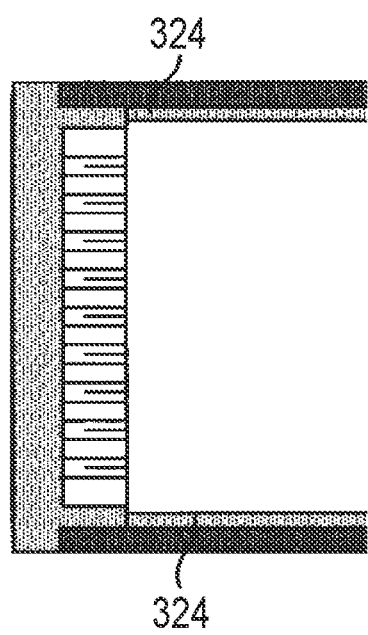
FIG. 25A is a diagram which shows an example of a configuration in which the second resin is disposed between the surface of the power generation element in the thickness direction and the inner surface of the exterior part in the thickness direction.

Therefore, in consideration of water vapor diffusion inside the resin, it is preferable that the second resin 324 is not disposed between the cover terminal 322 and the power generation element 310. In other words, the second resin 324 may be disposed solely at positions where the power generation element 310 and the exterior part 20 are able to come into contact with each other. Specifically, the second resin 324 may be disposed solely between the surface of the power generation element 310 in the width direction or the thickness direction and the inner surface of the cylindrical section 321 in the width direction or thickness direction. Alternatively, the second resin 324 may be disposed solely between the surface of the power generation element 310 in the width direction and the thickness direction and the inner surface of the cylindrical section 321 in the width direction and the thickness direction. FIG. 25A shows an example of a configuration in which the second resin 324 is disposed between the surface of the power generation element 310 in the thickness direction and the inner surface of the exterior part in the thickness direction. The reason why such a configuration is possible is that the secondary battery 103 is able to shorten the distance between the cover terminal 322 and the power generation element 310 (electrode laminate) as described above. Further, even in such a configuration, the cylindrical section 321, the cover terminal 322, and the power generation element 310 can be integrated with the second resin 324.

Figure 25B:
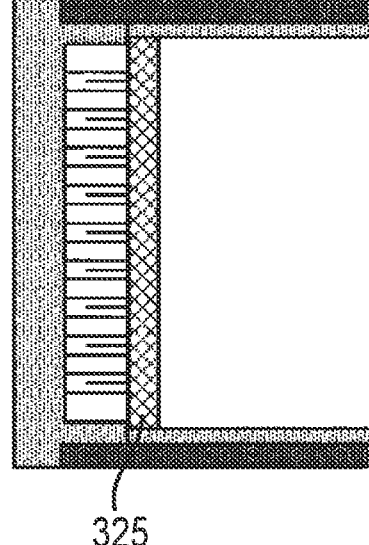
FIG. 25B is a diagram which shows an example of a configuration in which the insulation sheet is disposed between the cover terminal and the power generation element.

Further, FIG. 25B shows an example of a configuration in which the insulation sheet 325 is further disposed between the cover terminal 322 and the power generation element 310. Since the insulation sheet 325 is disposed in such a manner, it is possible to further reduce permeation of the water vapor diffused inside the resin into the power generation element 310 (electrode laminate).

Further, by disposing the second resin 324 solely at the position where the power generation element 310 and the cylindrical section 321 are capable of being in contact with each other, it is possible to suppress the power collectors 311 from being cut or broken in a case where the second resin 324 is filled.

The secondary battery according to the aspect of the present disclosure has been described above by using the secondary batteries 100 to 103 according to the embodiment. As described above, the secondary battery according to the aspect of the present disclosure can be structurally efficient. The secondary battery according to the aspect of the present disclosure can be used for any application. For example, the secondary battery according to the aspect of the present disclosure can be used as an in-vehicle secondary battery.

What is claimed is:

1. A secondary battery comprising:
   a power generation element; and
   an exterior part that houses the power generation element in the exterior part, wherein:
   the exterior part includes a cylindrical section that includes opening portions on two opposing sides, cover terminals that are disposed in the respective opening portions, and resins respectively disposed between the cylindrical section and the cover terminals;
   the cylindrical section and the cover terminals are respectively integrated with the resins;
   power collectors of the power generation element are electrically connected with the cover terminals, respectively, and
   the cylindrical section has a tubular shape with a rectangular cross-section, a portion of the cover terminals being located inside the cylindrical section, the portion having a width smaller than a width of the cylindrical section thereby forming a gap between the portion and the cylindrical section, the gap being filled by the resins.

2. The secondary battery according to claim 1, wherein a width or a thickness of each of the cover terminals is less than or equal to a width or a thickness of the power generation element.

3. The secondary battery according to claim 1, wherein regarding a relationship of a thickness of the cylindrical section, a thickness of an inner surface of the cylindrical section, a thickness of the power generation element, and thicknesses of the cover terminals, the thickness of the inner surface of the cylindrical section is less than the thickness of the cylindrical section, the thickness of the power generation element is equal to or less than the thickness of the inner surface of the cylindrical section, and the thicknesses of the cover terminals are less than or equal to the thickness of the power generation element.

4. The secondary battery according to claim 1, wherein regarding a relationship of the width of the cylindrical section, a width of an inner surface of the cylindrical section, a width of the power generation element, and widths of the cover terminals, the width of the inner surface of the cylindrical section is less than the width of the cylindrical section, the width of the power generation element is equal to or less than the width of the inner surface of the cylindrical section, and the widths of the cover terminals are less than or equal to the width of the power generation element.

5. The secondary battery according to claim 1, wherein the power collectors are curved and electrically connected with the cover terminals, respectively.

6. The secondary battery according to claim 1, wherein:
the power generation element includes at least one of the power collectors;
an inner surface of the cover terminal includes at least one slit portion; and
the power collector is disposed in the slit portion, and the power collector is electrically connected with the cover terminal.

7. The secondary battery according to claim 1, wherein an insulation sheet is disposed between the power generation element and each of the cover terminals.

8. The secondary battery according to claim 1, wherein:
the cover terminals respectively include projection portions that projects outward; and
the resin is disposed on at least a part of an outer circumferential surface of each of the projection portions.

9. The secondary battery according to claim 1, wherein the cover terminals include protrusion portions that protrude inward from end portions of inner surfaces of the cover terminals.

10. The secondary battery according to claim 1, wherein:
the exterior part includes a second resin filled in the exterior part; and
the cylindrical section, the cover terminals, and the power generation element are integrated with the second resin.

11. The secondary battery according to claim 1, wherein the cylindrical section is a cylindrical metal body or a metal laminate film which is formed into a cylindrical shape.

12. The secondary battery according to claim 1, wherein:
the cylindrical section is constituted of two metal plates and a third resin;
the metal plates each includes bottom surface and a protrusion portion that protrudes in the same direction from opposing end portions of the bottom surface;
the metal plates are superimposed upside down;
the protrusion portion is superimposed on each of opposing side surfaces of the cylindrical section;
the third resin is disposed to cover each of the side surfaces of the cylindrical section; and
the end portions of the superimposed metal plates are integrated with the third resin.

13. The secondary battery according to claim 1, wherein:
the cylindrical section is constituted of one metal plate and a third resin;
the metal plate is formed into a cylindrical shape;
an end portion of the metal plate is superimposed on one side surface of the cylindrical section, and the third resin is disposed to cover the side surface on which the end portions is superimposed; and
the end portion of the superimposed metal plate is integrated with the third resin.

* * * * *